(12) United States Patent
Nakashima et al.

(10) Patent No.: US 7,525,235 B2
(45) Date of Patent: Apr. 28, 2009

(54) OPTICAL APPARATUS HAVING A DRIVING SOURCE FOR DRIVING A LENS IN AN OPTICAL AXIS DIRECTION

(75) Inventors: Shigeo Nakashima, Utsunomiya (JP); Takehiko Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/403,382

(22) Filed: Apr. 12, 2006

(65) Prior Publication Data
US 2006/0238902 A1 Oct. 26, 2006

(30) Foreign Application Priority Data
Apr. 22, 2005 (JP) .............................. 2005-125753

(51) Int. Cl.
*H01L 41/00* (2006.01)
(52) U.S. Cl. .................... 310/328; 310/322; 310/323.01
(58) Field of Classification Search .................... 310/328
See application file for complete search history.

(56) References Cited

U.S. PATENT DOCUMENTS

| | | | | |
|---|---|---|---|---|
| 4,833,980 | A | * | 5/1989 | Bringhurst ............... 101/93.04 |
| 5,768,038 | A | * | 6/1998 | Emura ........................ 359/823 |
| 5,963,248 | A | * | 10/1999 | Ohkawa et al. ............. 348/169 |
| 6,002,531 | A | * | 12/1999 | Nakashima et al. ......... 359/699 |
| 6,404,104 | B1 | * | 6/2002 | Maeno et al. .......... 310/323.02 |
| 6,408,045 | B1 | * | 6/2002 | Matsui et al. .................. 378/34 |
| 6,493,567 | B1 | * | 12/2002 | Krivitski et al. ............. 600/322 |
| 6,779,933 | B2 | * | 8/2004 | Sato et al. ................... 396/463 |

FOREIGN PATENT DOCUMENTS

| | | | |
|---|---|---|---|
| CN | 1242473 A | | 1/2000 |
| JP | 64-90584 | | 4/1989 |
| JP | 04-212912 A | * | 8/1992 |
| JP | 06-153094 A | * | 5/1994 |
| JP | 07-104166 A | * | 4/1995 |
| JP | 07104166 A | * | 4/1995 |
| JP | 11-164576 | | 6/1999 |
| JP | 11-220891 | | 8/1999 |
| JP | 11-220892 | | 8/1999 |
| JP | 11-220893 | | 8/1999 |

OTHER PUBLICATIONS

May 18, 2007 Chinese Office Action (and English translation).

* cited by examiner

*Primary Examiner*—Jeffrey Donels
*Assistant Examiner*—Christopher Uhlir
(74) *Attorney, Agent, or Firm*—Locke Lord Bissell & Liddell LLP

(57) ABSTRACT

An optical apparatus is disclosed in which a press contact force for bringing a vibrator and a contact member into press contact with each other is generated between them, and thereby the reaction force of the press contact force is difficult to transmit outward. The optical apparatus comprises a lens holding member which holds a lens, and a vibration type linear actuator which drives the lens holding member in an optical axis direction. The vibration type linear actuator includes a vibrator on which vibration is produced through an electromechanical energy conversion action and a contact member which is in press contact with the vibrator. The vibrator and the contact member is in press contact with each other by a magnetic force acting between them.

2 Claims, 19 Drawing Sheets

PRIOR ART

OPTICAL APPARATUS HAVING A DRIVING SOURCE FOR DRIVING A LENS IN AN OPTICAL AXIS DIRECTION

BACKGROUND OF THE INVENTION

The present invention relates to an optical apparatus having a driving source for driving a lens in an optical axis direction, and particularly, to an optical apparatus which includes a vibration type linear actuator for use as a driving source.

Some optical apparatuses include a vibration type linear actuator for use as a driving source for driving a lens (for example, see Japanese Patent Laid-Open No. 10(1998)-90584).

In the optical apparatuses proposed in Japanese Patent Laid-Open No. 10(1998)-90584 having the vibration type linear actuator, the vibration type linear actuator is formed of a vibrator which produces vibration through an electromechanical energy conversion action and a contact member which is in press contact with the vibrator. The vibrator is fixed to a lens holding member, the contact member is fixed to a stationary member of a lens barrel, and the vibrator is caused to produce driving vibration, thereby moving the lens holding member together with the vibrator, or the contact member is fixed to the lens holding member, the vibrator is fixed to the stationary member of the lens barrel, and the vibrator is caused to produce driving vibration, thereby moving the lens holding member together with the contact member.

The description will be made of the lens barrel proposed in Japanese Patent Laid-Open No. 10(1998)-90584 using FIGS. 17 and 18.

In FIGS. 17A to 17D, reference numeral 901 denotes a lens holding frame, 902 denotes a guide bar which guides the lens holding frame 901 in the optical axis direction. Reference numeral 904 denotes a vibrator, 905 a supporting portion which supports the vibrator 904, 906 a contact member which is in press contact with the vibrator 904, and 907 a biasing member which produces the press contact force acting between the vibrator 904 and the contact member 906.

In FIG. 18, reference numeral 911 denotes a lens holding frame, and 913 a guide bush which is attached to the lens holding frame 911 and engages with a guide bar 930 in a movable condition in the optical axis direction. Reference numeral 920 denotes a vibrator holding frame which is provided on the guide bush 913, and 925*a* and 925*b* supporting portions which support a vibrator 923. Reference numeral 922 denotes a contact member which is fixed to a lens barrel main body, and 926 a spring which produces the press contact force acting between the vibrator 923 and the contact member 922.

In a case where the press contact force between the vibrator 904, 923 and the contact member 906, 922 is provided by the biasing member 907 and 926 as shown in FIGS. 17A to 17D and 18, the reaction force of the press contact force acts on the engagement parts of the lens holding member 901, 911 and the guide bar 902, 930, and a lateral pressure according to the press contact force acts on the engagement parts. The press contact force in the vibration type linear actuator is extremely large, so that such a lateral pressure increases the friction in the engagement part, thereby increasing the driving load. This causes problems that an increase of the output power of the vibration type linear actuator is required, the engagement part is worn, and it becomes difficult to perform a fine and accurate lens drive.

BRIEF SUMMARY OF THE INVENTION

It is an object of the present invention to provide an optical apparatus in which a press contact force for bringing a vibrator and a contact member into press contact with each other is generated between them to make the reaction force of the press contact force difficult to be transmitted to the outside of the vibrator and contact member.

According to an aspect, the present invention provides an optical apparatus comprising a lens holding member which holds a lens, and a vibration type linear actuator which drives the lens holding member in an optical axis direction. The vibration type linear actuator includes a vibrator on which vibration is produced through an electromechanical energy conversion action and a contact member which is in press contact with the vibrator. The vibrator and the contact member are in press contact with each other by a magnetic force acting between them.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
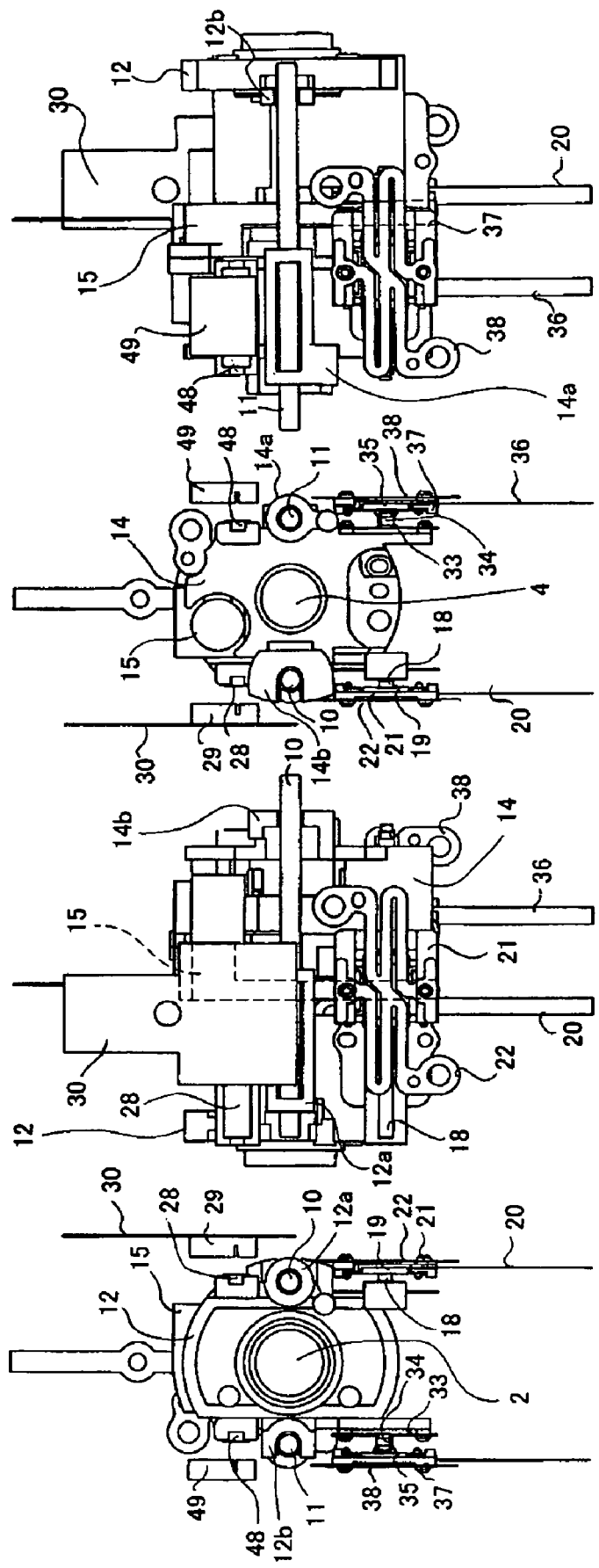
FIGS. 1A to 1D show the structure of a lens barrel of an image-taking apparatus which is Embodiment 1 of the present invention when viewed from four directions.
Figure 2:
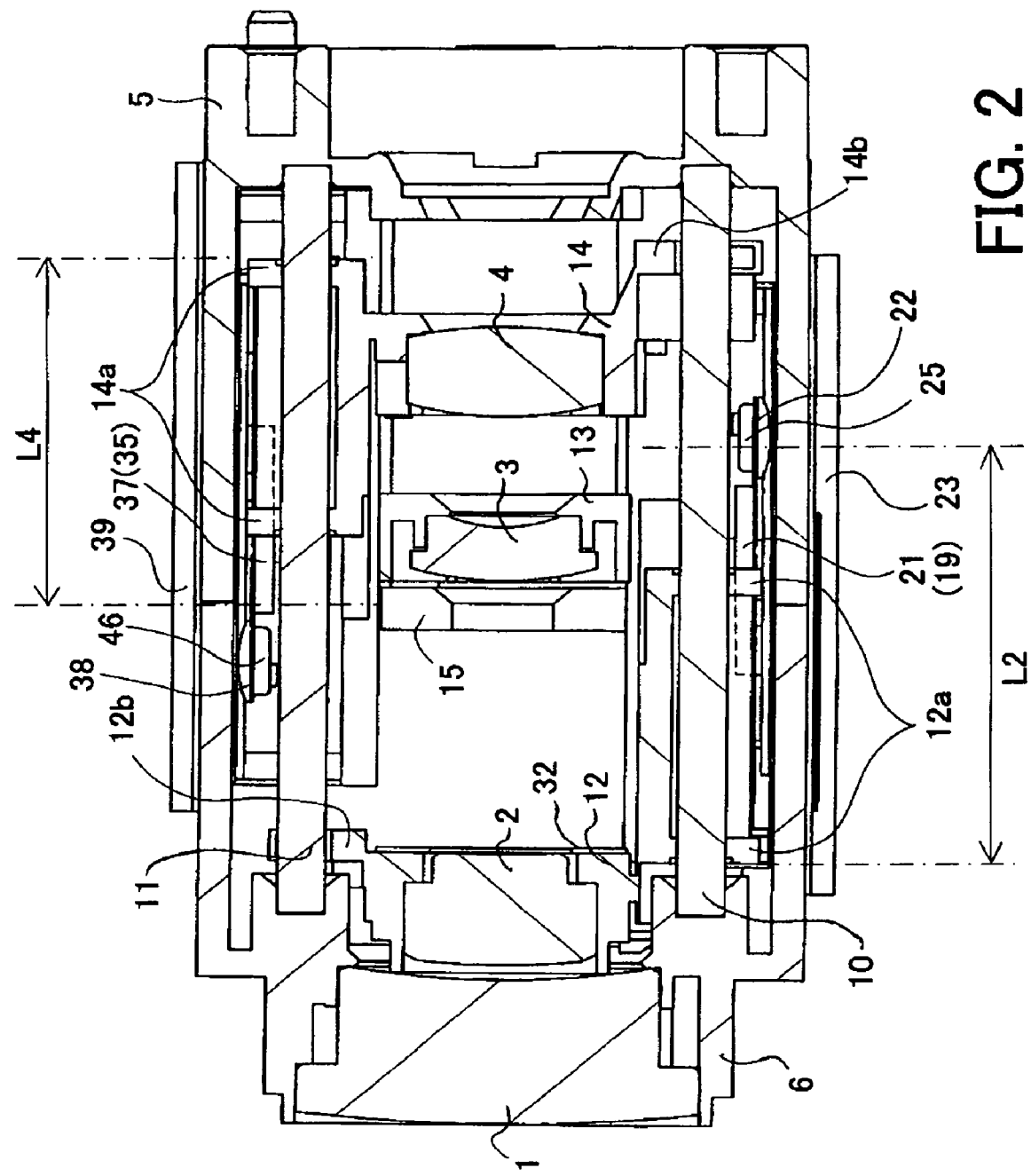
FIG. 2 is a section view showing the lens barrel in Embodiment 1 taken along a plane in parallel with an optical axis.
Figure 3:
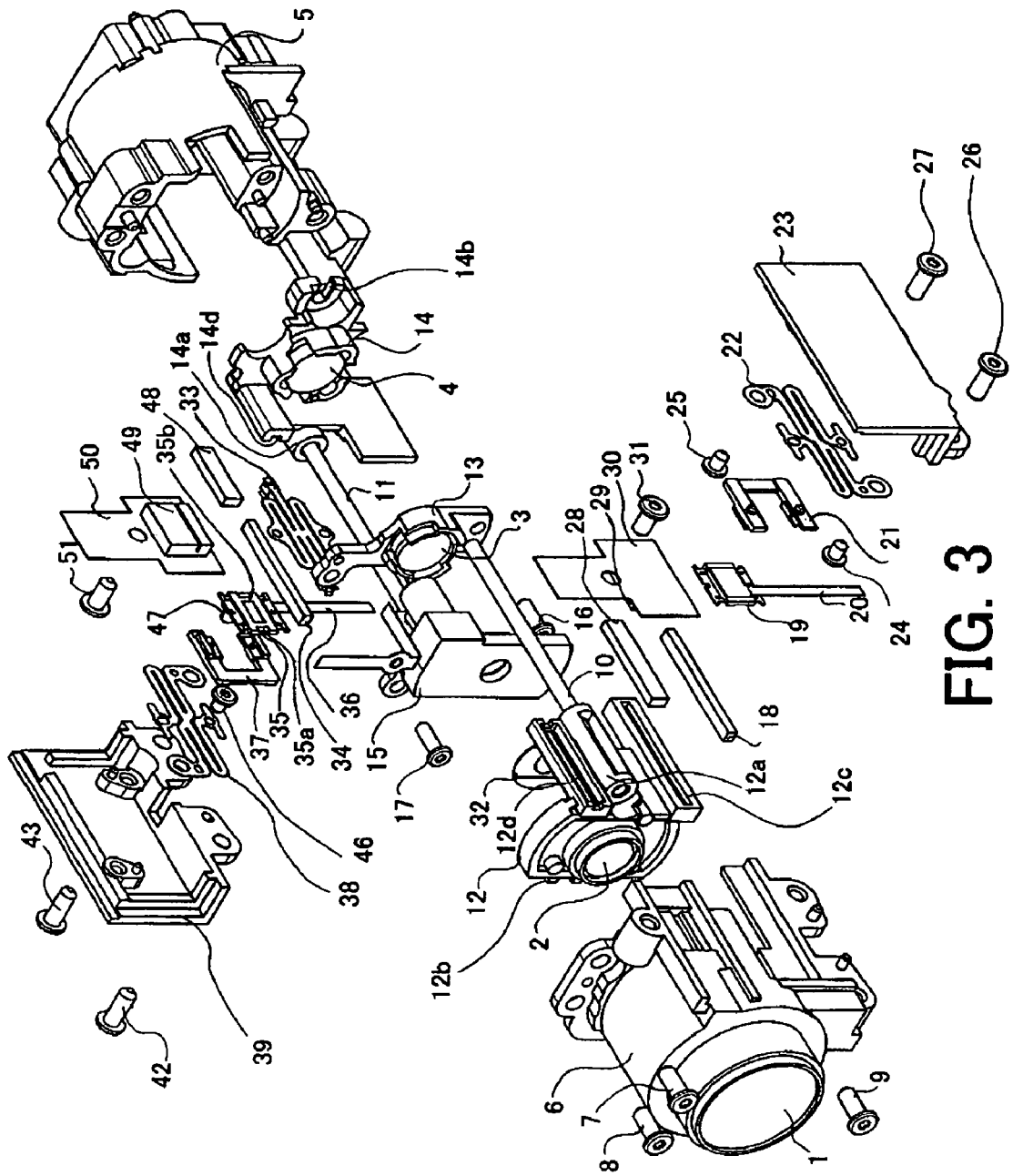
FIG. 3 is an exploded perspective view of the lens barrel in Embodiment 1.
Figure 4A:
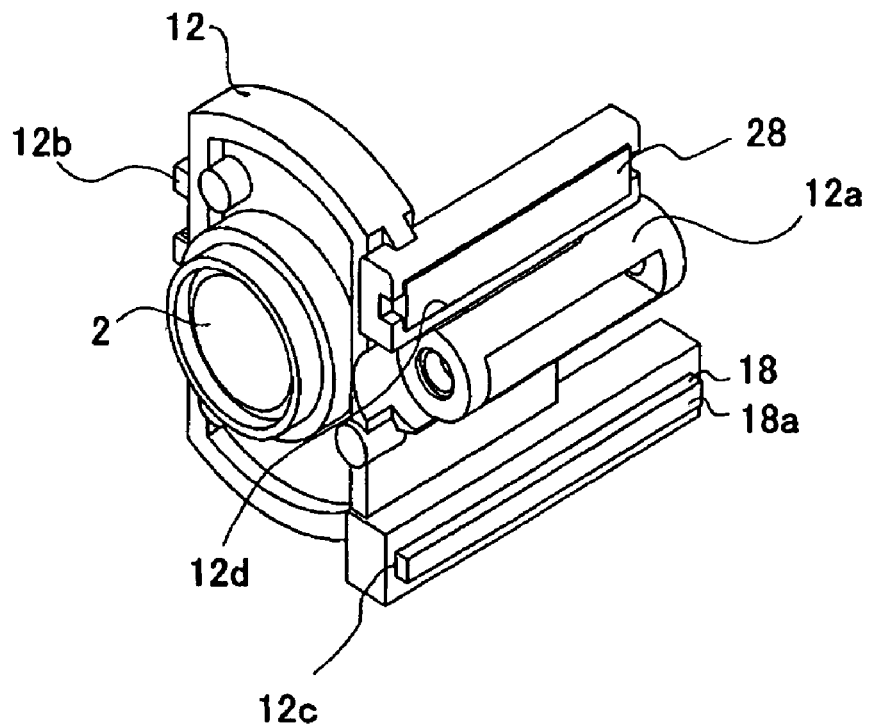
FIG. 4A is a perspective view showing a second lens holding member in the lens barrel in Embodiment 1.
Figure 4B:
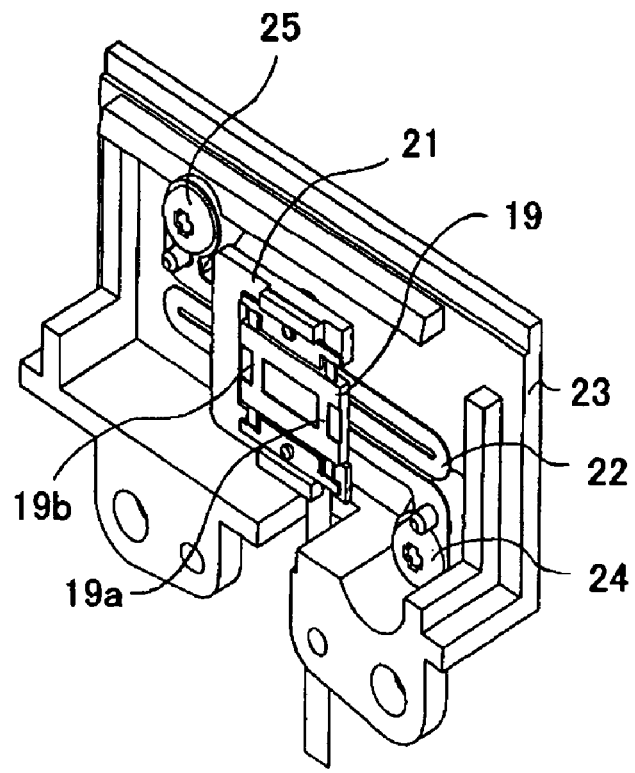
FIG. 4B is a perspective view showing a first vibration type linear actuator in the lens barrel in Embodiment 1.
Figure 5A:
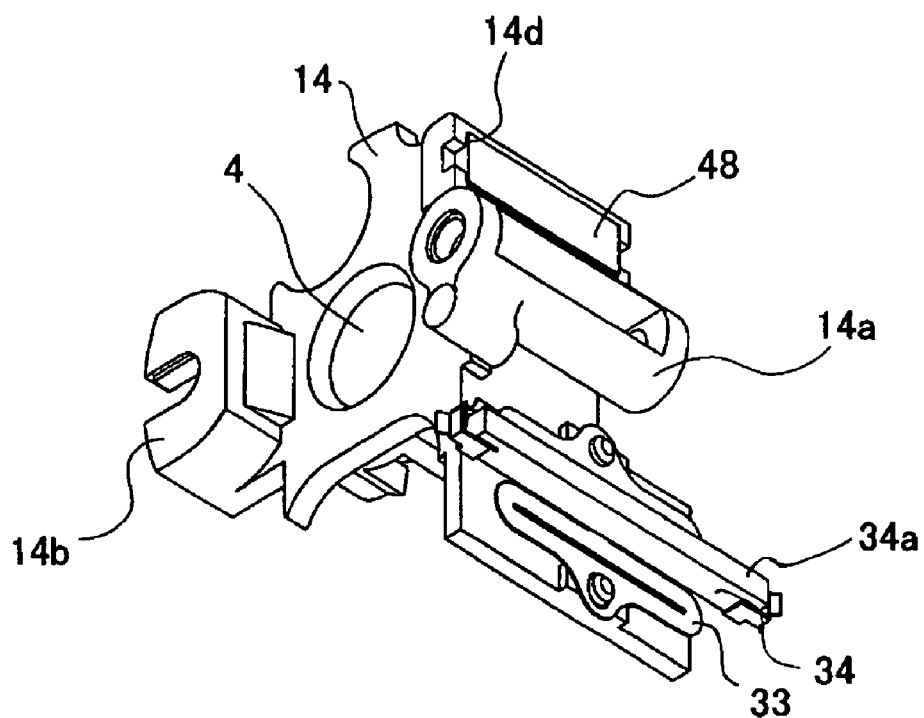
FIG. 5A is a perspective view showing a fourth lens holding member in the lens barrel in Embodiment 1.
Figure 5B:
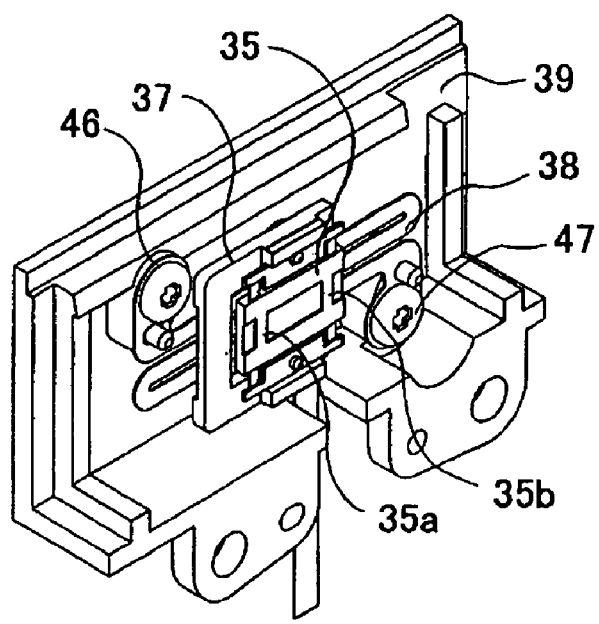
FIG. 5B is a perspective view showing a second vibration type linear actuator in the lens barrel in Embodiment 1.
Figure 5C:
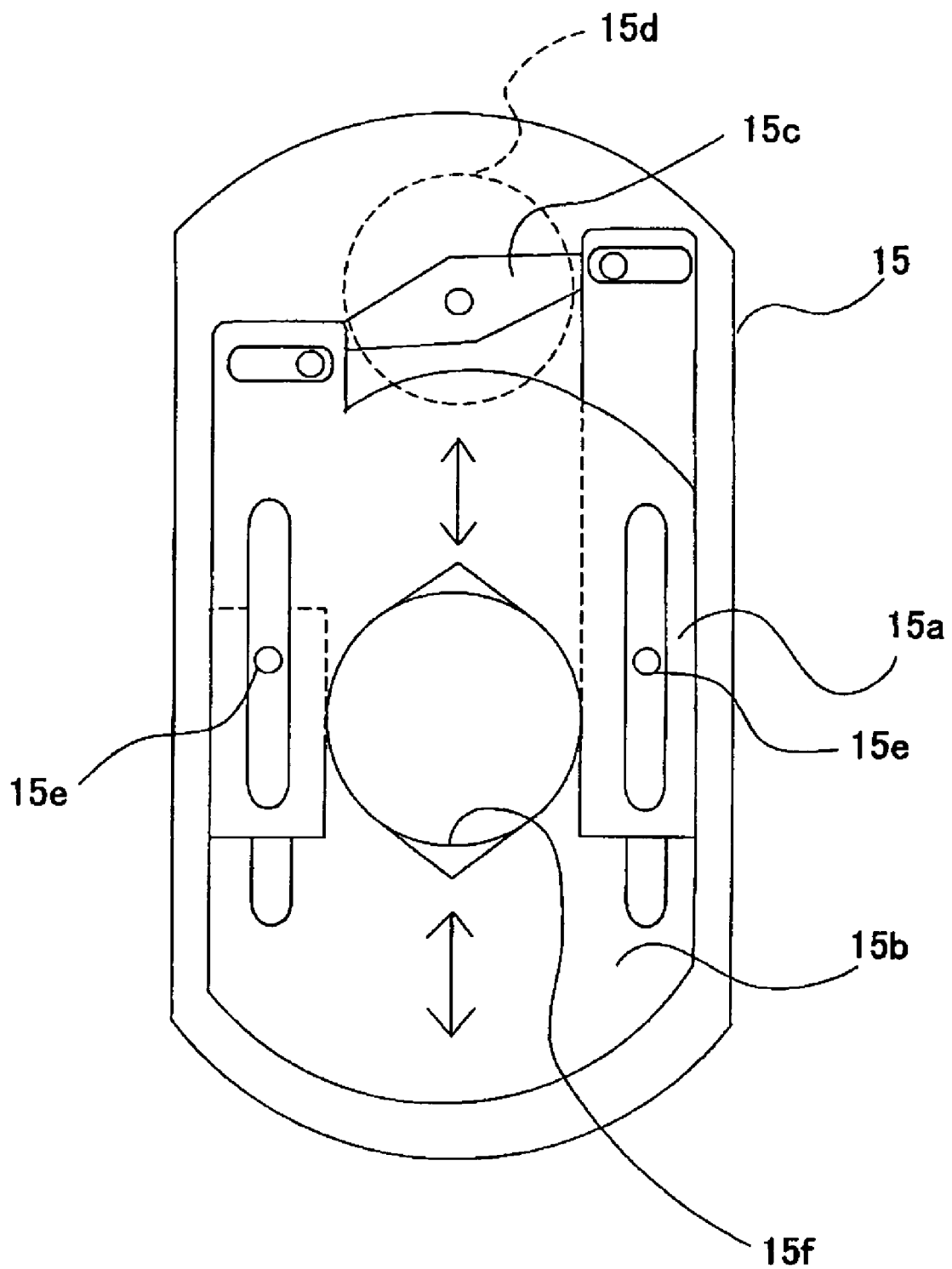
FIG. 5C schematically shows the structure of a light amount adjusting unit in the lens barrel in Embodiment 1.
Figure 6:
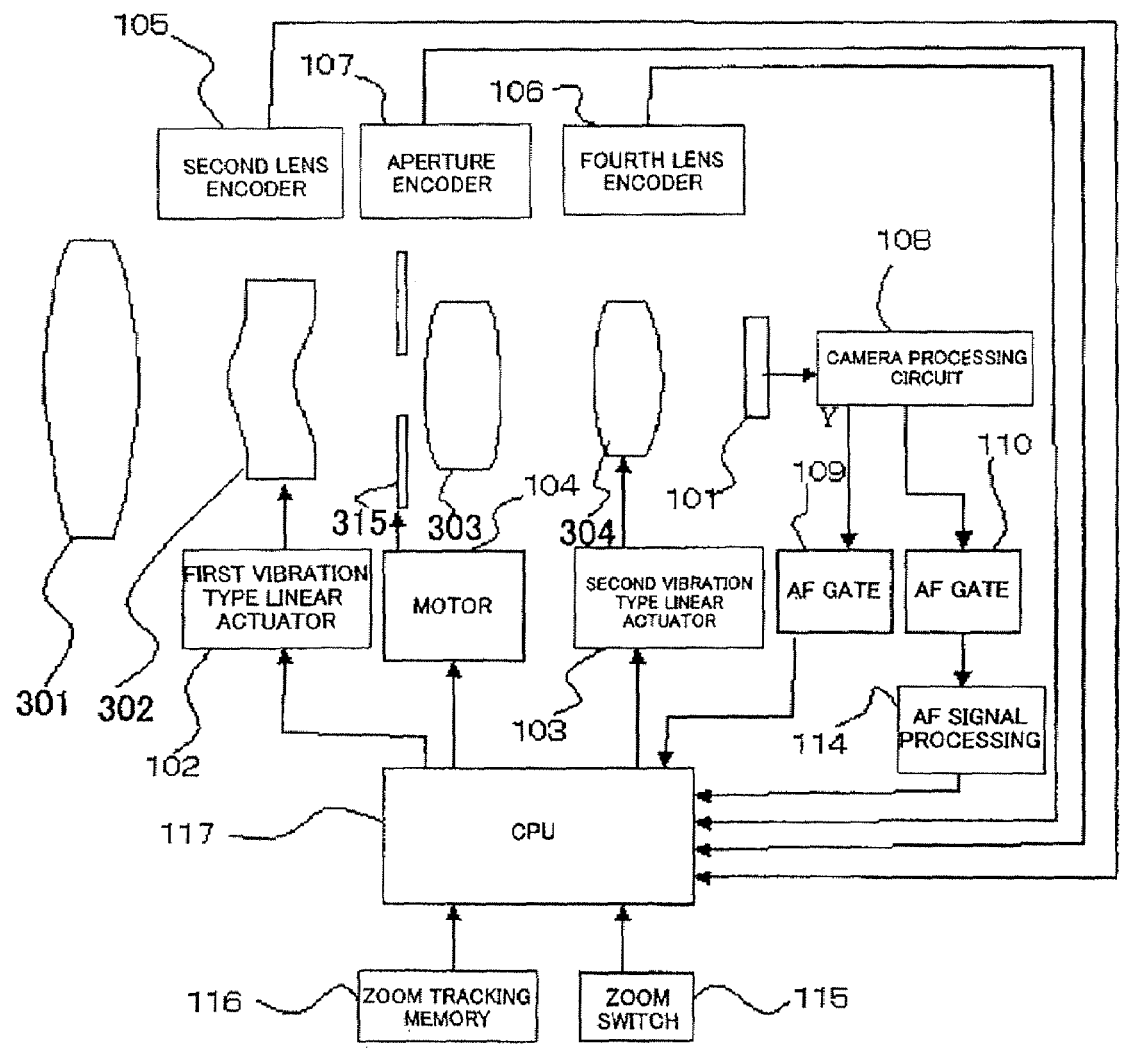
FIG. 6 is a block diagram showing the electrical structure of the image-taking apparatus of Embodiment 1.

FIGS. 1A to 1D show a lens barrel, with its exterior removed, in an image-taking apparatus (optical apparatus) which is Embodiment 1 of the present invention when viewed from four directions, the front, right, back, and left, respectively. FIG. 2 is a section view of the lens barrel taken along the plane including the optical axis of the lens barrel. FIG. 3 is an exploded perspective view of the lens barrel. FIGS. 4A and 4B are partial enlarged views showing a vibration type linear actuator for driving a second lens unit which forms part of the lens barrel. FIGS. 5A and 5B are partial enlarged views showing a vibration type linear actuator for driving a fourth lens unit which forms part of the lens barrel. FIG. 5C schematically shows the structure of a light amount adjusting unit which forms part of the lens barrel. FIG. 6 shows the electrical structure of the image-taking apparatus of Embodiment 1.

In FIGS. 1A to 6, in order from an object side, reference numerals 1 shows a fixed first lens unit, 2 the second lens unit which is movable in the optical axis direction for varying magnification, 15 the light amount adjusting unit, 3 a fixed third lens unit, and 4 the fourth lens unit which is movable in the optical axis direction for correcting image plane changes associated with varied magnification and for focal adjustment.

Reference numeral 5 shows a rear barrel which holds an image-pickup device, later described, and a low pass filter (LPF), and is fixed to a camera body, not shown. Reference numeral 6 shows a first lens holding member which holds the first lens unit 1 and is fixed to the rear barrel 5 by screws 7, 8, and 9.

Reference numerals 10 and 11 show guide bars (guide members) which are held substantially in parallel with the optical axis direction by the rear barrel 5 and the first lens holding member 6.

Reference numeral 12 shows a second lens holding member which holds the second lens unit 2 and to which a mask 32 for cutting unnecessary light is fixed. The second lens holding member 12 engages with the guide bar 10 at an engaging portion 12a to be guided in the optical axis direction and engages with the guide bar 11 at an engaging portion 12b to be prevented from rotation around the guide bar 10. Reference numeral 13 shows a third lens holding member which holds the third lens unit 3 and is fixed to the rear barrel 5 by a screw 16. Reference numeral 14 shows a fourth lens holding member which holds the fourth lens unit 4, and engages with the guide bar 11 at an engaging portion 14a to be guided in the optical axis direction and engages with the guide bar 10 at an engaging portion 14b to be prevented from rotation around the guide bar 11.

The light amount adjusting unit 15 has an outer shape which is longer in a vertical direction (first direction) than in a horizontal direction (second direction) when viewed from the optical axis direction. The light amount adjusting unit 15 is fixed to the rear barrel 5 by a screw 17. As shown in FIG. 5C, the light amount adjusting unit 15 is a so-called guillotine type aperture stop in which a pair of aperture blades 15a and 15b are substantially translated vertically by a lever 15c rotated by a motor 15d to increase or reduce the diameter of the aperture. Reference numeral 15f shows an opening formed by the plates of the light amount adjusting unit 15. The aperture blades 15a and 15b are guided vertically by guide pins 15e provided on the left and right. Unlike a so-called iris type or scissors type, the guillotine type aperture stop has the horizontal dimension substantially smaller than the vertical dimension since the aperture blades 15a and 15b are substantially translated vertically.

Reference numeral 18 shows a slider (contact member) which is formed of a magnet and a friction material bonded to each other and is fixed into a groove 12c formed in the second lens holding member 12 through adhesion or the like. Reference numeral 19 shows a vibrator which is formed of an electromechanical energy conversion element and a plate-shaped elastic member on which vibration is produced by the electromechanical energy conversion element. The elastic member of the vibrator 19 is made of ferromagnet which is attracted by the magnet of the slider 18 to bring a press contact surface 18a of the friction material of the slider 18 into press contact with press contact surfaces 19a and 19b formed at two positions in the optical axis direction in the elastic member of the vibrator 19.

In a first vibration type linear actuator formed of the slider 18 and the vibrator 19, two frequency signals (pulse signals or alternate signals) in difference phases are input to the electromechanical energy conversion element through a flexible wiring board 20 to create a substantially elliptic motion in the press contact surfaces 19a and 19b of the vibrator 19 to produce driving force in the optical axis direction in the press contact surface 18a of the slider 18.

Reference numeral 21 shows a spacer to which the vibrator 19 is fixed, and 22 a plate spring to which the spacer 21 is fixed. The plate spring 22 has a shape which is not easily deformed in the in-plane direction of the plate and is easily deformed in the direction perpendicular to the plate plane. The plate spring 22 is easily deformed in the rotation direction around an arbitrary axis included in the plane, and when deformed, it holds the press contact surfaces 19a and 19b of the vibrator 19 in parallel with the press contact surface 18a of the slider 18. The plate spring 22 not easily deformed in the in-plane direction limits displacement of the vibrator 19 in the optical axis direction (that is, the driving direction).

Reference numeral 23 shows a vibrator holding member which is fixed to the first lens holding member 6 by screws 26 and 27 and to which the plate spring 22 is fixed by screws 24 and 25. Reference numeral 28 shows a scale which detects the moving amount (position) of the second lens holding member 12 and is fixed into a groove 12d formed in the second lens holding member 12 through adhesion or the like. Reference numeral 29 shows a light transmitter/receiver element which applies light to the scale 28 and receives the light reflected by the scale 28 to detect the moving amount of the second lens holding member 12. The light transmitter/receiver element 29 and the scale 28 constitute a first linear encoder serving as a detector. Reference numeral 30 shows a flexible wiring board which sends and receives a signal to and from the light transmitter/receiver element 29 and is fixed to the first lens holding member 6 by a screw 31.

As shown in FIG. 1A, the guide bar 10, the first vibration type linear actuator formed of the vibrator 19 and the slider 18, and the first linear encoder formed of the light transmitter/receiver element 29 and the scale 28 are arranged along or close to a planar right side of the light amount adjusting unit 15 (linear long side on the right when viewed from the optical axis direction) that is one of the outer surfaces closest to the optical axis position of the light amount adjusting unit 15 of all of the outer surfaces thereof when viewed from the front of the optical axis direction. The first vibration type linear actuator and the first linear encoder are disposed vertically next to the guide bar 10 to sandwich the guide bar 10.

Reference numeral 33 shows a plate spring which is fixed to the fourth lens holding member 14. Reference numeral 34 shows a slider (contact member) which is formed of a magnet and a friction material bonded to each other and is fixed to the plate spring 33 through adhesion or the like. The plate spring 33 has a shape which is not easily deformed in the in-plane direction of the plate and is easily deformed in the direction perpendicular to the plate plane. The plate spring 33 is easily deformed in the rotation direction around an arbitrary axis included in the plane, and it holds a press contact surface 34a of the slider 34 in parallel with press contact surfaces 35a and 35b of a vibrator 35. The plate spring 33 not easily deformed in the in-plane direction limits displacement of the slider 34 in the optical axis direction (that is, the driving direction).

The vibrator 35 is formed of an electromechanical energy conversion element and a plate-shaped elastic member on which vibration is produced by the electromechanical energy conversion element. The elastic member of the vibrator 35 is made of ferromagnet which is attracted by the magnet of the slider 34 to bring the press contact surface 34a of the friction material of the slider 34 into press contact with the press contact surfaces 35a and 35b formed at two positions in the optical axis direction in the elastic member of the vibrator 35.

In a second vibration type linear actuator formed of the slider 34 and the vibrator 35, two frequency signals (pulse signals or alternate signals) in difference phases are input to the electromechanical energy conversion element through a flexible wiring board 36 to create a substantially elliptic motion in the press contact surfaces 35a and 35b of the vibrator 35b to produce driving force in the optical axis direction in the press contact surface 34a of the slider 34.

As shown in FIG. 2, the second lens holding member 12 (engaging portion 12a engaging with the guide bar 10) has a movable range L2 in the optical axis direction which extends from the object side (the left in FIG. 2) of the light amount adjusting unit 15 toward the image plane side when viewed from the direction perpendicular to the optical axis. The fourth lens holding member 14 (engaging portion 14a engaging with the guide bar 11) has a movable range L4 in the optical axis direction which extends from the image plane side of the light amount adjusting unit 15 into the light amount adjusting unit 15. In other words, the movable ranges of the second lens holding member 12 and the fourth lens holding member 14 overlap each other in the optical axis direction. Accordingly, the range in which the first vibration type linear actuator is placed (the range in which the slider 18 is provided) and the range in which the second vibration type linear actuator is placed (the range in which the slider 34 is provided) overlap each other in the optical axis direction.

Reference numeral 37 shows a spacer to which the vibrator 35 is fixed, and 38 a plate spring to which the spacer 37 is fixed. The plate spring 38 has a shape which is not easily deformed in the in-plane direction of the plate and is easily deformed in the direction perpendicular to the plate plane. The plate spring 38 is easily deformed in the rotation direction around an arbitrary axis included in the plane, and it holds the press contact surfaces 35a and 35b of the vibrator 35 in parallel with the press contact surface 34a of the slider 34. The plate spring 38 not easily deformed in the in-plane direction limits displacement of the vibrator 35 in the optical axis direction (that is, the driving direction).

Reference numeral 39 shows a vibrator holding member which is fixed to the rear barrel 5 by screws 42 and 43 and to which the plate spring 38 is fixed by screws 46 and 47.

Reference numeral 48 shows a scale which detects the moving amount (position) of the fourth lens holding member 14 and is fixed into a groove 14d formed in the fourth lens holding member 14 through adhesion or the like. Reference numeral 49 shows a light transmitter/receiver element which applies light to the scale 48 and receives the light reflected by the scale 48 to detect the moving amount of the fourth lens holding member 14. The light transmitter/receiver element 49 and the scale 48 constitute a second linear encoder serving as a detector. Reference numeral 50 shows a flexible wiring board which sends and receives a signal to and from the light transmitter/receiver element 49 and is fixed to the rear barrel 5 by a screw 51.

As shown in FIG. 1A, the guide bar 11, the second vibration type linear actuator formed of the vibrator 35 and the slider 34, and the second linear encoder formed of the light transmitter/receiver element 49 and the scale 48 are arranged along or close to a planar left side of the light amount adjusting unit 15 (linear long side on the left when viewed from the optical axis direction) that is the other outer surface closest to the optical axis position of the light amount adjusting unit 15 of all of the outer surfaces thereof when viewed from the front of the optical axis direction. The second vibration type linear actuator and the second linear encoder are disposed vertically next to the guide bar 11 to sandwich the guide bar 11.

The set of the first vibration type linear actuator, the guide bar 10, and the first linear encoder, and the set of the second vibration type linear actuator, the guide bar 11, and the second linear encoder are arranged substantially symmetrically with respect to an axis extending vertically through the center of the optical axis.

In FIG. 6, reference numeral 101 shows the image-pickup device formed of a CCD sensor, a CMOS sensor or the like. Reference numeral 102 shows the first vibration type linear actuator which includes the slider 18 and the vibrator 19, and serves as a driving source of the second lens unit 2 (second lens holding member 12). Reference numeral 103 shows the second vibration type linear actuator which includes the slier 34 and the vibrator 35, and serves as a driving source of the fourth lens unit 4 (fourth lens holding member 14).

Reference numeral 104 shows the motor which serves as a driving source of the light amount adjusting unit 15. Reference numeral 105 shows a second lens encoder realized by the first linear encoder which includes the scale 28 and the light transmitter/receiver element 29, 106 a fourth lens encoder realized by the second linear encoder which includes the scale 48 and the light transmitter/receiver element 49. These encoders detect the relative positions (moving amounts from a reference position) of the second lens unit 2 and the fourth lens unit 4 in the optical axis direction, respectively. While Embodiment 1 employs optical encoders as the encoders, it is possible to use a magnetic encoder or an encoder which detects an absolute position by using electrical resistance.

Reference numeral 107 shows an aperture encoder which is, for example, of the type in which a hall element is provided within the motor 104 as the driving source of the light amount adjusting unit 15 and is used to detect a rotational position relationship between a rotor and a stator of the motor 104.

Reference numeral 117 shows a CPU serving as a controller responsible for control of operation of the image-taking apparatus. Reference numeral 108 shows a camera signal processing circuit which performs amplification, gamma correction or the like on the output from the image-pickup device 101. After the predetermined processing, a contrast signal of a video signal is transmitted through an AE gate 109 and an AF gate 110. The gates 109 and 110 set an optimal range in the entire screen for extracting the signal for exposure setting and focusing. These gates 109 and 110 may have variable sizes, or a plurality of gates 109 and 110 may be provided.

Reference numeral 114 shows an AF (auto-focus) signal processing circuit for auto-focus which extracts a high-frequency component of the video signal to produce an AF evaluation value signal. Reference numeral 115 shows a zoom switch for zooming operation. Reference numeral 116 shows a zoom tracking memory which stores information about target positions to which the fourth lens unit 4 is to be driven in accordance with the camera-to-object distance and the position of the second lens unit 2 in order to maintain an in-focus state in varying magnification. Memory in the CPU 117 may be used as the zoom tracking memory.

In the abovementioned structure, when a user operates the zoom switch 115, the CPU 117 controls the first vibration type linear actuator 102 for driving the second lens unit 2 and calculates the target driving position of the fourth lens unit 4 based on the information in the first zoom tracking memory 116 and the current position of the second lens unit 2 determined from the detection result of the second lens unit encoder 105 to control the second vibration type linear actuator 103 for driving of the fourth lens unit 4 to that target driving position. Whether or not the fourth lens unit 4 has reached the target driving position is determined by the matching of the current position of the fourth lens unit 4 determined from the detection result of the fourth lens unit encoder 106 with the target driving position.

In the auto-focus, the CPU 117 controls the second vibration type linear actuator 103 to drive the fourth lens unit 4 to search for the position where the AF evaluation value determined by the AF signal processing circuit 114 is at the peak.

To provide appropriate exposure, the CPU 117 controls the motor 104 of the light amount adjusting unit 15 to increase or reduce the aperture diameter such that the average value of the luminance signal through the AE gate 109 is equal to a predetermined value, that is, such that the output from the aperture encoder 107 has a value corresponding to the predetermined value.

In the abovementioned structure, the slider 18 is formed by using the magnet which attracts the vibrator 19 to provide the press contact force necessary for producing the driving force as the vibration type linear actuator. Thus, any reaction force of the press contact force does not act on the second lens holding member 12. As a result, the frictional force produced at the engaging portions 12a and 12b of the second lens holding member 12 engaging with the guide bars 10 and 11 is not increased, and the driving load due to the friction is not increased. In addition, the plate spring 22 produces small force, so that the force acting from the plate spring 22 on the engaging portions 12a and 12b engaging with the guide bars 10 and 11 is small and hardly increases the frictional force produced at the engaging portions 12a and 12b. This enables the use of the low-power and small vibration type linear actuator, resulting in a reduction in size of the lens barrel.

Since large press contact force does not act on the second lens holding member 12, the frictional force produced at the engaging portions 12a and 12b of the second lens holding member 12 engaging with the guide bars 10 and 11 is not increased. The power or size of the first vibration type linear actuator 102 does not need to be increased, and the wear (abrasion) due to the friction between the guide bars 10, 11 and the engaging portions 12a, 12b can be reduced. Also, the fine driving of the second lens holding member 12 (second lens unit 2) can be accurately achieved.

Even when a manufacturing error or the like changes the position of any press contact surface with respect to an axis in parallel with the optical axis or the inclination around that axis in the optical axis direction, the plate spring 22 is deformed to change the position or inclination (orientation) of the vibrator 19 to maintain both of the press contact surfaces in parallel with each other, thereby holding an appropriate contact state between the surfaces. The plate spring 22 has a spring constant set such that it is deformed in response to a smaller force than the abovementioned press contact force. The press contact force is not changed greatly even when the position or inclination of any press contact surface is changed. Consequently, it is possible to provide stably an output consistent with the performance inherent in the first vibration type linear actuator 102.

On the other hand, the slider 34 is formed by using the magnet which attracts the vibrator 35 to provide the press contact force necessary for producing the driving force as the vibration type linear actuator. Thus, any reaction force of the press contact force does not act on the fourth lens holding member 14. As a result, the frictional force produced at the engaging portions 14a and 14b of the fourth lens holding member 14 engaging with the guide bars 11 and 10 is not increased, and the driving load due to the friction is not increased. In addition, the plate springs 33 and 38 produce small force, so that the force acting from the plate springs 33 and 38 on the engaging portions 14a and 14b engaging with the guide bars 11 and 10 is small and hardly increases the frictional force produced at the engaging portions 14a and 14b. This enables the use of the low-power and small vibration type linear actuator, resulting in a reduction in size of the lens barrel.

Since large press contact force does not act on the fourth lens holding member 14, the frictional force produced at the engaging portions 14a and 14b of the fourth lens holding member 14 engaging with the guide bars 11 and 10 is not increased. The power or size of the second vibration type linear actuator 103 does not need to be increased, and the wear due to the friction between the guide bars 10, 11 and the engaging portions 14a, 14b can be reduced. Also, the fine driving of the fourth lens holding member 14 (fourth lens unit 4) can be accurately achieved.

Even when a manufacturing error or the like changes the position of any press contact surface with respect to an axis in parallel with the optical axis or the inclination around that axis in the optical axis direction, the plate springs 33 and 38 are deformed to change the position or inclination (orientation) of the vibrator 34 to maintain both of the press contact surfaces in parallel with each other, thereby holding an appropriate contact state between the surfaces. Each of the plate springs 33 and 38 has a spring constant set such that it is deformed in response to a smaller force than the abovementioned press contact force. The press contact force is not changed greatly even when the position or inclination of any press contact surface is changed. Consequently, it is possible to provide stably an output consistent with the performance inherent in the second vibration type linear actuator 103.

As described above, in Embodiment 1, the guide bar 10, the first vibration type linear actuator, and the first linear encoder are arranged along (close to) the right side which is one of the flat surfaces of the light amount adjusting unit 15 closest to the optical axis when viewed from the optical axis direction. The first vibration type linear actuator and the first linear encoder are disposed next to the guide bar 10 below and above, respectively. In addition, the guide bar 11, the second vibration type linear actuator, and the second linear encoder are arranged along (close to) the left side which is one of the flat surfaces of the light amount adjusting unit 15 closest to the optical axis when viewed from the optical axis direction. The second vibration type linear actuator and the second linear encoder are disposed next to the guide bar 11 below and above, respectively.

Thus, although the optical apparatus has the light amount adjusting unit 15, the two vibration type linear actuators for driving the second and fourth lens holding members 12 and 14 (second and fourth lens units 2 and 4) disposed on the object side and the image plane side of the light amount adjusting unit 15, the two guide bars 10 and 11 for guiding the lens holding members 12 and 14 in the optical axis direction, and the two linear encoders for detecting the positions of the lens holding members 12 and 14, it can be formed in a compact size.

Since the sliders 18 and 34 are disposed next to the guide bars 10 and 11, respectively, the second and fourth lens holding members 12 and 14 can be driven smoothly. In addition, the scales 28 and 48 disposed next to the guide bars 10 and 11 reduce displacement of the scales 28 and 48 due to backlash of the engaging portions 12a, 12b and 14a, 14b of the second and forth lens holding members 12 and 14 engaging with the guide bars 10 and 11 to enable accurate detection of positions.

When the linear actuator and the linear encoder are disposed across the optical axis from the guide bar for guiding the lens holding member which is driven and whose position is detected by them, the linear encoder may be moved in the direction opposite to the driving direction with the guide bar as the supporting point at the start of the driving due to backlash at the engaging portion of the lens holding member engaging with the guide bar. This may reduce the accuracy of the position detection. In Embodiment 1, however, the linear actuator and the linear encoder are disposed on the same side as the guide bar for guiding the lens holding member which is driven and whose position is detected by them, so that such a problem does not arise and the position can be detected accurately.

Embodiment 2

Figure 7:
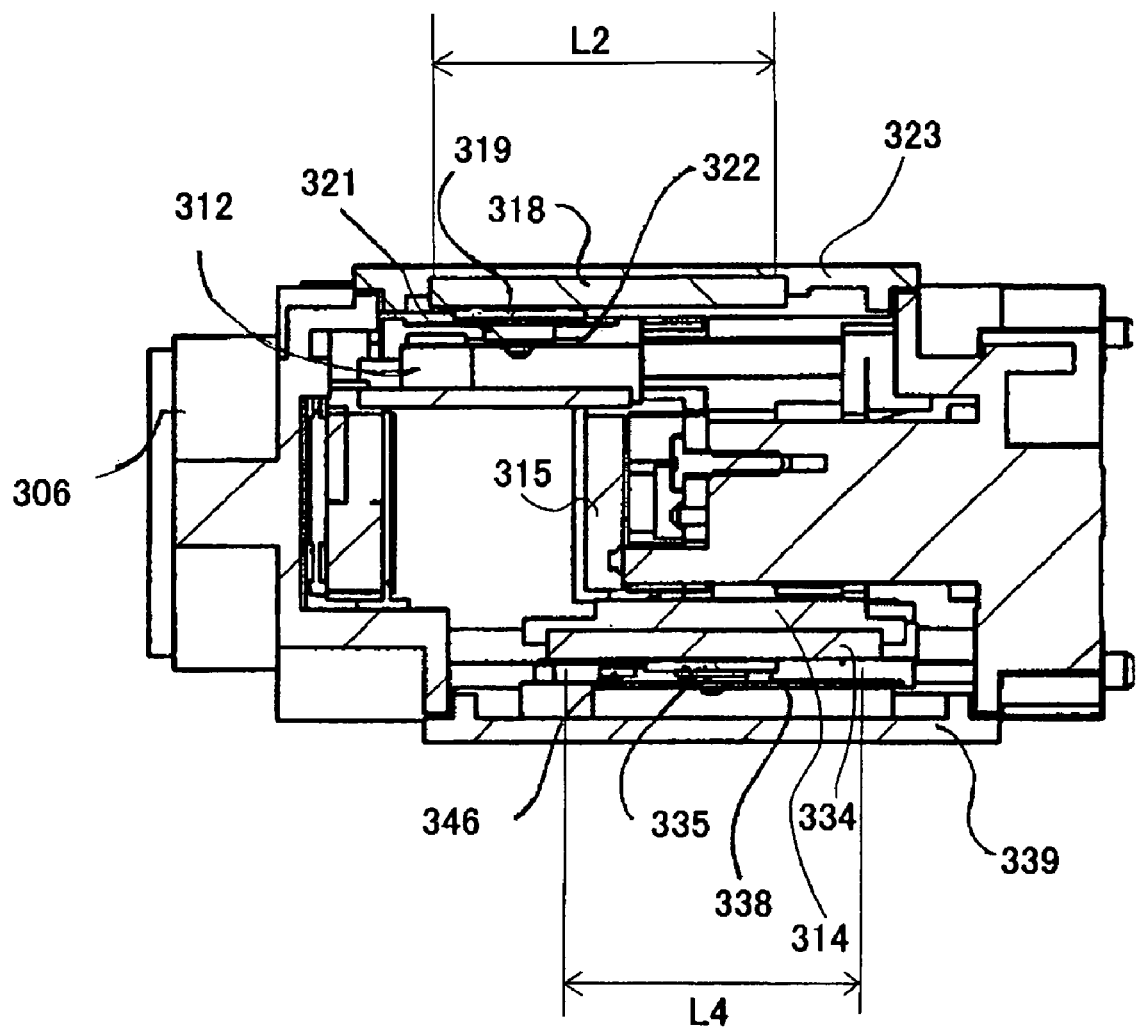
FIG. 7 is a section view showing a lens barrel in Embodiment 2 of the present invention taken along a plane in parallel with an optical axis.
Figure 8:
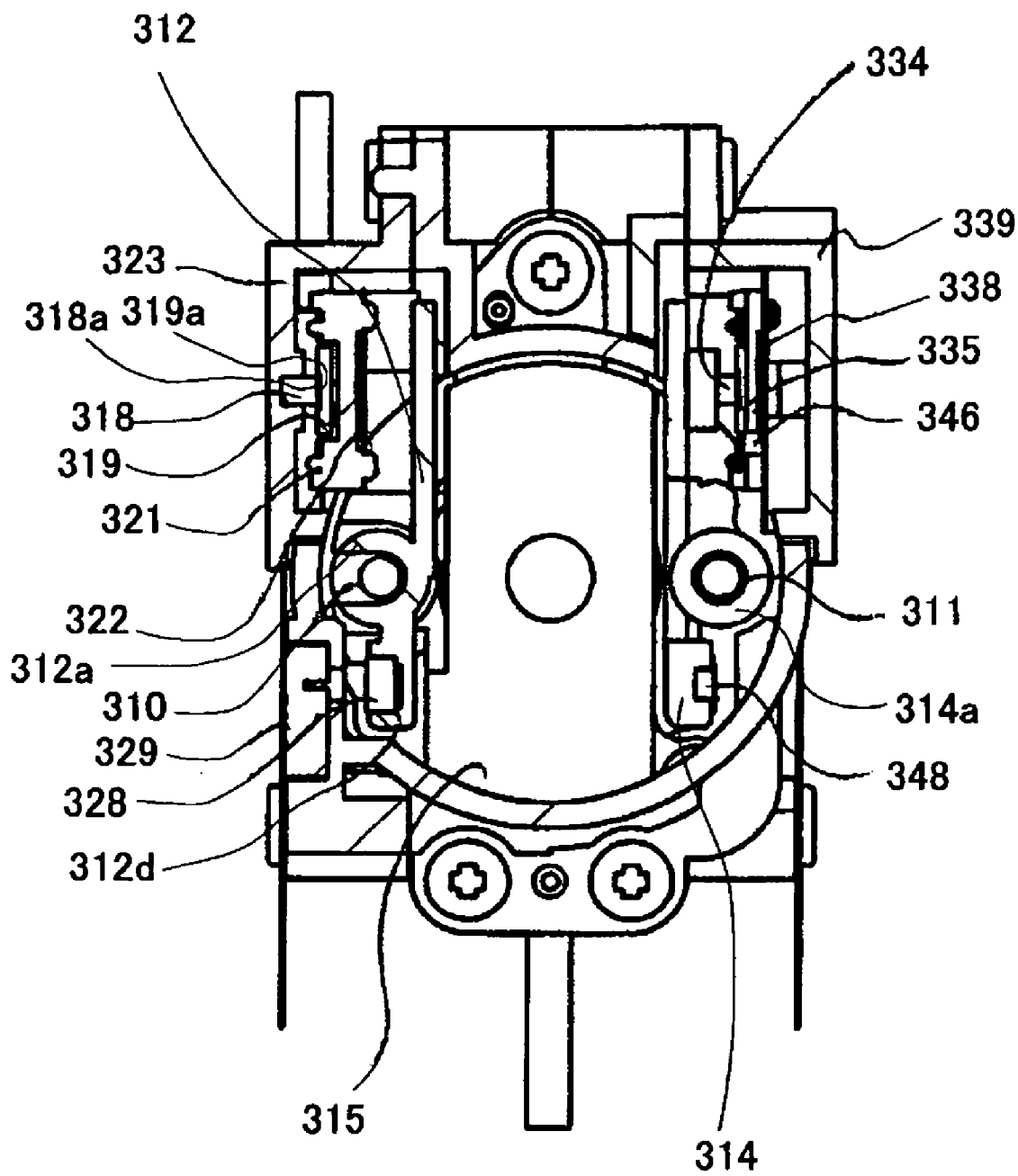
FIG. 8 is a section view showing the lens barrel in Embodiment 2 taken along a plane perpendicular to the optical axis.
Figure 9:
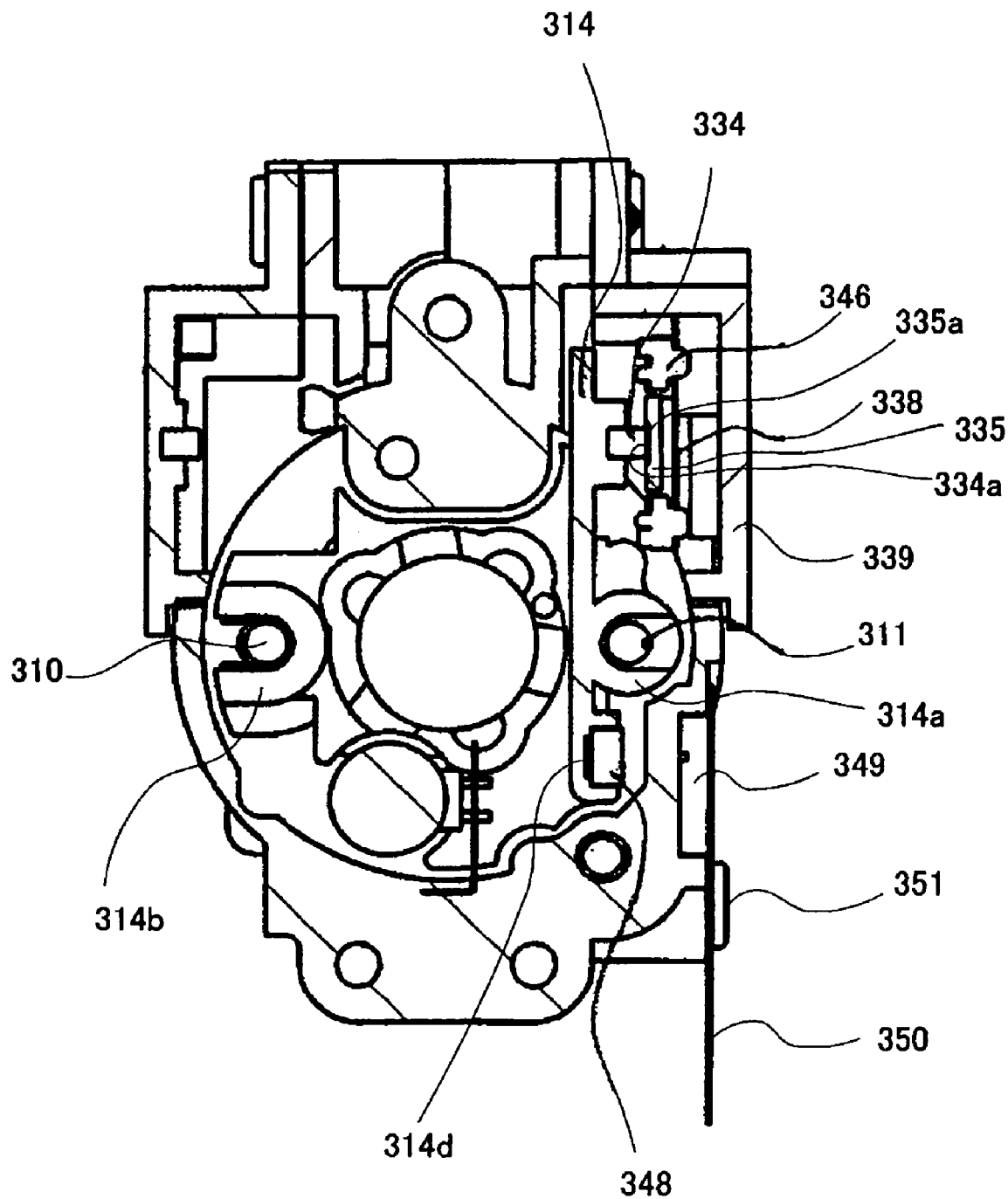
FIG. 9 is a section view showing the lens barrel in Embodiment 2 taken along a plane perpendicular to the optical axis.
Figure 10:
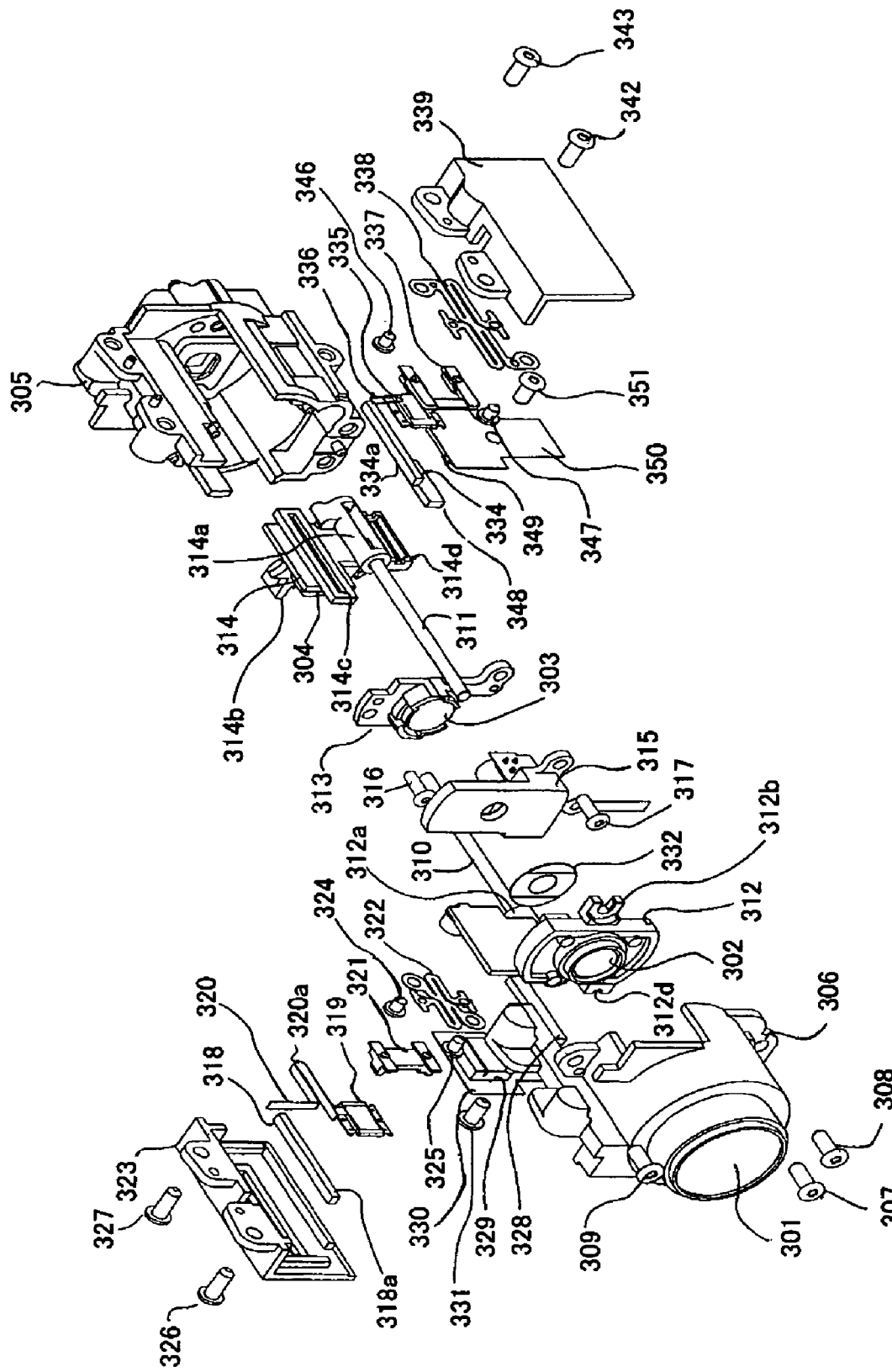
FIG. 10 is an exploded perspective view showing the lens barrel in Embodiment 2.
Figure 11:
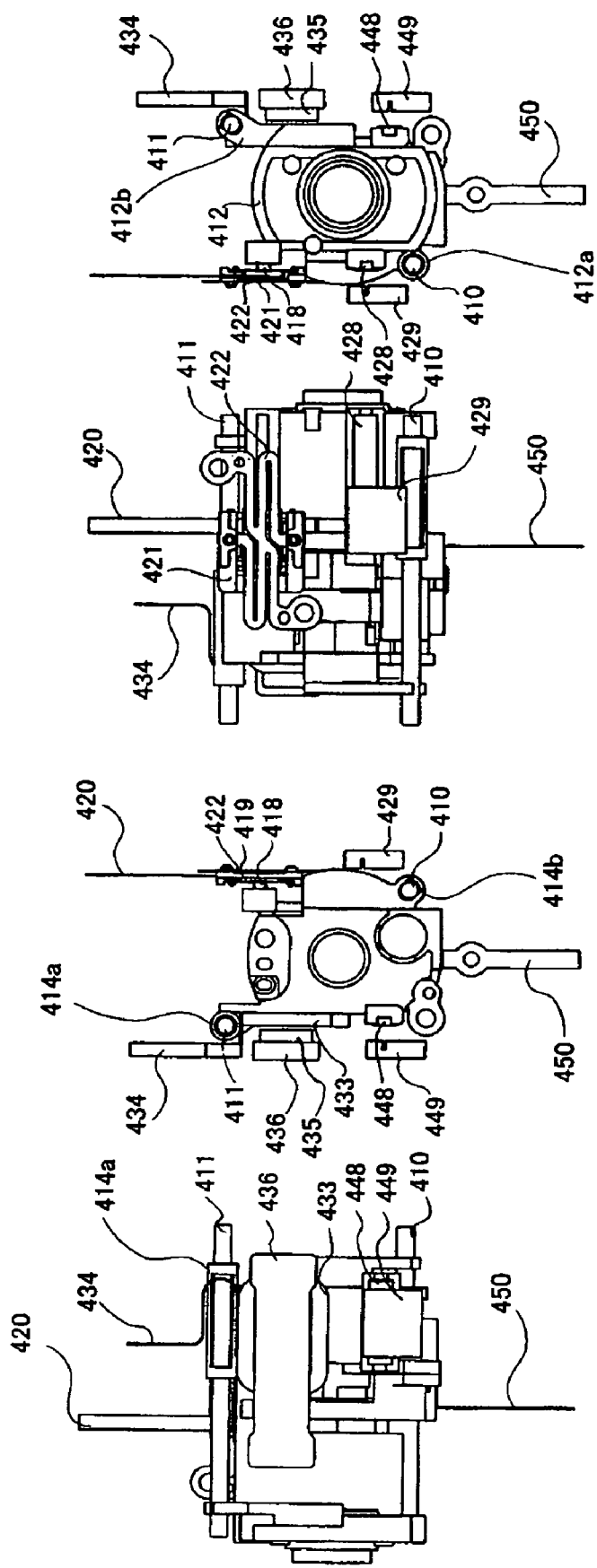
FIGS. 11A to 11D show the structure of a lens barrel of an image-taking apparatus which is Embodiment 3 of the present invention when viewed from four directions.

FIGS. 7 to 10 show the structure of a lens barrel of an image-taking apparatus which is Embodiment 2 of the present invention. FIG. 7 shows a section view of the lens barrel in Embodiment 2 taken along a plane in parallel with an optical axis and perpendicular to a press contact surface between a slider and vibrator of a vibration type linear actuator. FIG. 8 shows a section view of the lens barrel in Embodiment 2 taken along a plane perpendicular to the optical axis and perpendicular to a press contact surface of a vibration type linear actuator for driving a second lens unit when viewed from an object side. FIG. 9 shows a section view of the lens barrel in Embodiment 2 taken along a plane perpendicular to the optical axis and perpendicular to a press contact surface of a vibration type linear actuator for driving a fourth lens unit when viewed from the object side. FIG. 10 is an exploded view showing the lens barrel in Embodiment 2. The image-taking apparatus of Embodiment 2 has the same electrical structure as that in Embodiment 1.

In FIGS. 7 to 10, in order from the object side, reference numeral 301 shows a fixed first lens unit, 302 the second lens unit which is movable in the optical axis direction for varying magnification, 315 a light amount adjusting unit, 303 a fixed third lens unit, and 304 the fourth lens unit which is movable in the optical axis direction for correcting image plane changes associated with varied magnification and for focal adjustment.

Reference numeral 305 shows a rear barrel which holds an image-pickup device, later described, and a low pass filter (LPF), and is fixed to a camera body, not shown. Reference numeral 306 shows a first lens holding member which holds the first lens unit 301 and is fixed to the rear barrel 305 by screws 307, 308, and 309.

Reference numerals 310 and 311 show guide bars (guide members) which are held substantially in parallel with the optical axis direction by the rear barrel 305 and the first lens holding member 306.

Reference numeral 312 shows a second lens holding member which holds the second lens unit 302 and to which a mask 332 for cutting unnecessary light is fixed. The second lens holding member 312 engages with the guide bar 310 at an engaging portion 312a to be guided in the optical axis direction and engages with the guide bar 311 at an engaging portion 312b to be prevented from rotation around the guide bar 310. Reference numeral 313 shows a third lens holding member which holds the third lens unit 303 and is fixed to the rear barrel 305 by a screw 316. Reference numeral 314 shows a fourth lens holding member which holds the fourth lens unit 304, and engages with the guide bar 311 at an engaging portion 314a to be guided in the optical axis direction and engages with the guide bar 310 at an engaging portion 314b to be prevented from rotation around the guide bar 311.

The light amount adjusting unit 315 has an outer shape which is longer in a vertical direction (first direction) than in a horizontal direction (second direction) when viewed from the optical axis direction. The light amount adjusting unit 315 is fixed to the rear barrel 305 by a screw 317. The light amount adjusting unit 215 has the same structure as that in Embodiment 1 shown in FIG. 5C.

Reference numeral 318 shows a slider which is formed of a magnet and a friction material bonded to each other. Reference numeral 319 shows a vibrator which is formed of an electromechanical energy conversion element and a plate-shaped elastic member on which vibration is produced by the electromechanical energy conversion element. The elastic member of the vibrator 319 is made of ferromagnet which is attracted by the magnet of the slider 318 to bring an press contact surface 318a of the friction material of the slider 318 into press contact with press contact surfaces 319a (formed at two positions in the optical axis direction as in Embodiment 1) of the elastic member of the vibrator 319.

Reference numeral 320 shows a flexible wiring board which is connected to the vibrator 319 and transmits a signal to the electromechanical energy conversion element. The flexible wiring board 320 has a bend portion (deformation portion) 320a which is deformed as the second lens holding member 312 is moved in the optical axis direction.

In a first vibration type linear actuator formed of the slider 318 and the vibrator 319, while the slier 318 is in press contact with the vibrator 319, two frequency signals (pulse signals or alternate signals) in difference phases are input to the electromechanical energy conversion element through the flexible wiring board 320 to create a substantially elliptic motion in the press contact surfaces 319a of the vibrator 319 to produce driving force in the optical axis direction in the press contact surface 318a of the slider 318.

Reference numeral 321 shows a spacer which fixes the vibrator 319, 322 a plate spring which fixes the spacer 321. The plate spring 322 has a shape which is not easily deformed in the in-plane direction, is easily deformed in the direction perpendicular to the plane, and is easily deformed in the rotation direction around an arbitrary axis included in the plane. The plate spring 322 not easily deformed in the in-plane direction limits displacement of the vibrator 319 in the optical axis direction (that is, the driving direction).

Reference numerals 324 and 325 show screws which secure the plate spring 322 to the second lens holding member 312. Reference numeral 323 shows a vibrator frame to which the slider 318 is fixed through adhesion or the like. The vibrator frame 323 is fixed to the first lens holding member 306 by screws 326 and 327.

Reference numeral 328 shows a scale which detects the position of the second lens holding member 312 and is fixed into a square hole 312d of the second lens holding member 312 through adhesion or the like.

Reference numeral 329 shows a light transmitter/receiver element which applies light to the scale 328 and receives the light reflected by the scale 28 to detect the moving amount of the second lens holding member 312. The scale 328 and the light transmitter/receiver element 329 constitute a first linear encoder serving as a detector.

Reference numeral 330 shows a flexible wiring board which sends and receives a signal to and from the light transmitter/receiver element 329 and is fixed to the first lens holding member 306 by a screw 331.

As shown in FIG. 8, the guide bar 310, the first vibration type linear actuator formed of the vibrator 319 and the slider 318, and the first linear encoder formed of the light transmitter/receiver element 329 and the scale 328 are arranged along or close to a planar left side of the light amount adjusting unit 315 (linear long side on the left when viewed from the optical axis direction) that is one of the outer surfaces closest to the optical axis position of the light amount adjusting unit 315 of all of the outer surfaces thereof when viewed from the front of the optical axis direction. The first vibration type linear actuator and the first linear encoder are disposed vertically next to the guide bar 310 to sandwich the guide bar 310.

Reference numeral 334 shows a slider which is formed of a magnet and a friction material bonded to each other and is fixed to a square frame 314c of the fourth lens holding member 314 through adhesion or the like. Reference numeral 335 shows a vibrator which is formed of an electromechanical energy conversion element and a plate-shaped elastic member on which vibration is produced by the electromechanical energy conversion element. The elastic member of the vibrator 335 is made of ferromagnet which is attracted by the magnet of the slider 334 to bring an press contact surface 334a of the friction material of the slider 334 into press contact with press contact surfaces 335a (formed at two positions in the optical axis direction as in Embodiment 1) of the elastic member of the vibrator 335.

Reference numeral 336 shows a flexible wiring board which is connected to the electromechanical conversion element of the vibrator 335. In a second vibration type linear actuator formed of the slider 334 and the vibrator 335, while the slider 334 is in press contact with the vibrator 335, two frequency signals (pulse signals or alternate signals) in difference phases are input to the electromechanical energy conversion element through the flexible wiring board 336 to create a substantially elliptic motion in the press contact surfaces 335a of the vibrator 335 to produce driving force in the optical axis direction in the press contact surface 334a of the slider 334.

As shown in FIG. 7, the range in which the first vibration type linear actuator is placed in the optical axis direction (the range in which the slider 318 is placed) and a movable range L2 of the second lens holding member 312 in the optical axis direction extend from the object side (the left in FIG. 7) of the light amount adjusting unit 315 toward the image plane side when viewed from the direction orthogonal to the optical axis direction. The range in which the second vibration type linear actuator is placed in the optical axis direction (the range in which the slider 334 is placed) and a movable range L4 of the fourth lens holding member 314 in the optical axis direction extend from the image plane side of the light amount adjusting unit 315 toward the object side. In other words, the ranges in which the first and second linear actuators are placed (the movable ranges of the second and fourth lens holding members 312 and 314) overlap each other in the optical axis direction.

Reference numeral 337 shows a spacer for holding the vibrator 335, 338 a plate spring for holding the spacer 337. The plate spring 338 has a shape which is not easily deformed in the in-plane direction, is easily deformed in the direction perpendicular to the plane, and is easily deformed in the rotation direction around an arbitrary axis included in the plane. The plate spring 338 not easily deformed in the in-plane direction limits displacement of the vibrator 335 in the optical axis direction (that is, the driving direction).

Reference numeral 339 shows a vibrator holding member which holds the plate spring 338 and to which the plate spring 338 is attached 6 by screws 346 and 347. The vibrator holding member 339 is fixed to the rear barrel 305 by screws 342 and 343.

Reference numeral 348 shows a scale which detects the position of the fourth lens holding member 314 and is fixed into a square hole 314d in the fourth lens holding member 314 through adhesion or the like. Reference numeral 349 shows a light transmitter/receiver element which applies light to the scale 348 and receives the light reflected by the scale 348 to detect the moving amount of the fourth lens holding member 314. Reference numeral 350 shows a flexible wiring board which sends and receives a signal to and from the light transmitter/receiver element 349 and is fixed to the rear barrel 305 by a screw 351.

As shown in FIG. 9, the guide bar 311, the second vibration type linear actuator formed of the vibrator 335 and the slider 334, and the second linear encoder formed of the light transmitter/receiver element 349 and the scale 348 are arranged along or close to a planar right side of the light amount adjusting unit 315 (linear long side on the right when viewed from the optical axis direction) that is one of the outer surfaces closest to the optical axis position of the light amount adjusting unit 315 of all of the outer surfaces thereof when viewed from the front of the optical axis direction. The second vibration type linear actuator and the second linear encoder are disposed vertically next to the guide bar 311 to sandwich the guide bar 311.

In addition, the set of the first vibration type linear actuator, the guide bar 310, and the first linear encoder, and the set of the second vibration type linear actuator, the guide bar 311, and the second linear encoder are arranged substantially symmetrically with respect to an axis extending vertically through the center of the optical axis.

In the abovementioned structure, the slider 318 is formed by using the magnet which attracts the vibrator 319 to provide the press contact force necessary for producing the driving force as the vibration type linear actuator. Thus, any reaction force of the press contact force does not act on the second lens holding member 312. As a result, the frictional force produced at the engaging portions 312a and 312b of the second lens holding member 312 engaging with the guide bars 310 and 311 is not increased and the driving load due to the friction is not increased. In addition, the plate spring 322 produces small force, so that the force acting from the plate spring 322 on the engaging portions 312a and 312b engaging with the guide bars 310 and 311 is small and hardly increases the frictional force produced at the engaging portions 312a and 312b. This enables the use of the low-power and small vibration type linear actuator, resulting in a reduction in size of the lens barrel.

Since large press contact force does not act on the second lens holding member 312, the frictional force produced at the engaging portions 312a and 312b of the second lens holding member 312 engaging with the guide bars 310 and 311 is not increased. The power or size of the first vibration type linear actuator does not need to be increased, and the wear due to the friction between the guide bars 310, 311 and the engaging portions 312a, 312b can be reduced. Also, the fine driving of the second lens holding member 312 (second lens unit 302) can be accurately achieved.

Even when a manufacturing error or the like changes the position of any press contact surface with respect to an axis in parallel with the optical axis or the inclination around that axis in the optical axis direction, the plate spring 322 is deformed to change the position or inclination (orientation) of the vibrator 319 to maintain both of the press contact surfaces in parallel with each other, thereby holding an appropriate contact state between the surfaces. The plate spring 322 has a spring constant set such that it is deformed in response to a smaller force than the abovementioned press contact force. The press contact force is not changed greatly even when the position or inclination of any press contact surface is changed. Consequently, it is possible to provide stably an output consistent with the performance inherent in the first vibration type linear actuator.

On the other hand, the slider 334 is formed by using the magnet which attracts the vibrator 335 to provide the press contact force necessary for producing the driving force as the vibration type linear actuator. Thus, any reaction force of the press contact force does not act on the fourth lens holding member 314. As a result, the frictional force produced at the engaging portions 314a and 314b of the fourth lens holding member 314 engaging with the guide bars 311 and 310 is not increased and the driving load due to the friction is not increased. In addition, the plate springs 338 produce small force, so that the force acting from the plate springs 338 on the engaging portions 314a and 314b engaging with the guide bars 311 and 310 is small and hardly increases the frictional force produced at the engaging portions 314a and 314b. This enables the use of the low-power and small vibration type linear actuator, resulting in a reduction in size of the lens barrel.

Since large press contact force does not act on the fourth lens holding member 314, the frictional force produced at the engaging portions 314a and 314b of the fourth lens holding member 314 engaging with the guide bars 311 and 310 is not increased. The power or size of the second vibration type linear actuator does not need to be increased, and the wear due to the friction between the guide bars 311, 310 and the engaging portions 314a, 314b can be reduced. Also, the fine driving of the fourth lens holding member 314 (fourth lens unit 304) can be accurately achieved.

Even when a manufacturing error or the like changes the position of any press contact surface with respect to an axis in parallel with the optical axis or the inclination around that axis in the optical axis direction, the plate spring 338 is deformed to change the position or inclination (orientation) of the vibrator 335 to maintain both of the press contact surfaces in parallel with each other, thereby holding an appropriate contact state between the surfaces. The plate spring 338 has a spring constant set such that it is deformed in response to a smaller force than the abovementioned press contact force. The press contact force is not changed greatly even when the position or inclination of any press contact surface is changed. Consequently, it is possible to provide stably an output consistent with the performance inherent in the second vibration type linear actuator.

When the lens holding member is moved by a large amount, the slider needs to have a great length. To allow the movement of that long slider in the optical axis direction, long space for the slider movement needs to be ensured in the optical axis direction. In Embodiment 2, however, in the first vibration type linear actuator for driving the second lens holding member 312 which is moved by a larger amount as compared with the fourth lens holding member 314, the slider 318 having a greater length in the optical axis direction than that of the slider 334 of the second vibration type linear actuator is fixed, while the vibrator 319 is moved together with the second lens holding member 312 in the optical axis direction. Since the long slider 318 is not moved in the optical axis direction in this manner, only the short space may be required for placing the first vibration type linear actuator in the optical axis direction, which enables a reduction in size of the lens barrel.

In Embodiment 2, in the second vibration type actuator for driving the fourth lens holding member 314 which is moved by a smaller amount as compared with the second lens holding member 312, the slider 334 is fixed to the fourth lens holding member 314 and is moved in the optical axis direction, while the vibrator 335 is fixed and is not moved in the optical axis direction. Thus, the flexible wiring board 350 does not need to have any deformation portion, so that the flexible wiring board 350 can be easily handled to enhance the flexibility in design. This allows a reduction in size of the lens barrel.

As described above, in Embodiment 2, the guide bar 310, the first vibration type linear actuator, and the first linear encoder are arranged along (close to) the left side which is one of the flat surfaces of the light amount adjusting unit 315 closest to the optical axis when viewed from the optical axis direction. The first vibration type linear actuator and the first linear encoder are disposed next to the guide bar 310 above and below, respectively.

In addition, the guide bar 311, the second vibration type linear actuator, and the second linear encoder are arranged along (close to) the right side which is one of the flat surfaces of the light amount adjusting unit 315 closest to the optical axis when viewed from the optical axis direction. The second vibration type linear actuator and the second linear encoder are disposed next to the guide bar 311 above and below, respectively.

Thus, although the optical apparatus has the light amount adjusting unit 315, the two vibration type linear actuators for driving the second and fourth lens holding members 312 and 314 (second and fourth lens units 302 and 304) disposed on the object side and the image plane side of the light amount adjusting unit 315, the two guide bars 310 and 311 for guiding the lens holding members 312 and 314 in the optical axis direction, and the two linear encoders for detecting the positions of the lens holding members 312 and 314, it can be formed in a compact size.

Since the sliders 318 and 334 are disposed next to the guide bars 310 and 311, the second and fourth lens holding members 312 and 314 can be driven smoothly. In addition, the scales 328 and 348 disposed next to the guide bars 310 and 311 reduce displacement of the scales 328 and 348 due to backlash of the engaging portions 312a, 312b and 314a, and 314b of the second and forth lens holding members 312 and 314 engaging with the guide bars 310 and 311 to enable accurate detection of positions.

When the linear actuator and the linear encoder are disposed across the optical axis from the guide bar for guiding the lens holding member which is driven and whose position is detected by them, the linear encoder may be moved in the direction opposite to the driving direction with the guide bar as the supporting point at the start of the driving due to backlash at the engaging portion of the lens holding member engaging with the guide bar. This may reduce the accuracy of the position detection. In Embodiment 2, however, the linear actuator and the linear encoder are disposed on the same side as the guide bar for guiding the lens holding member which is driven and whose position is detected by them, so that such a problem does not arise and the position can be detected accurately.

Embodiment 3

Figure 12:
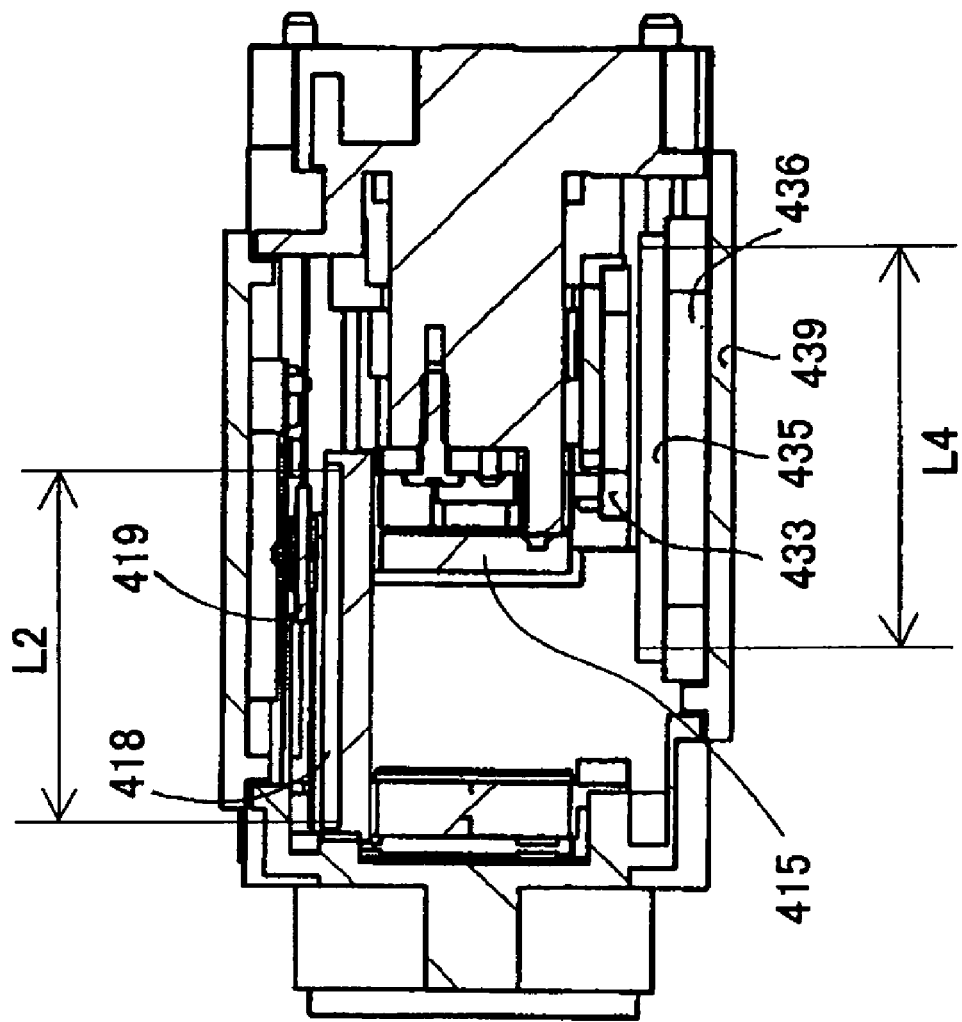
FIG. 12 is a section view showing the lens barrel in Embodiment 3 taken along a plane in parallel with an optical axis.
Figure 13:
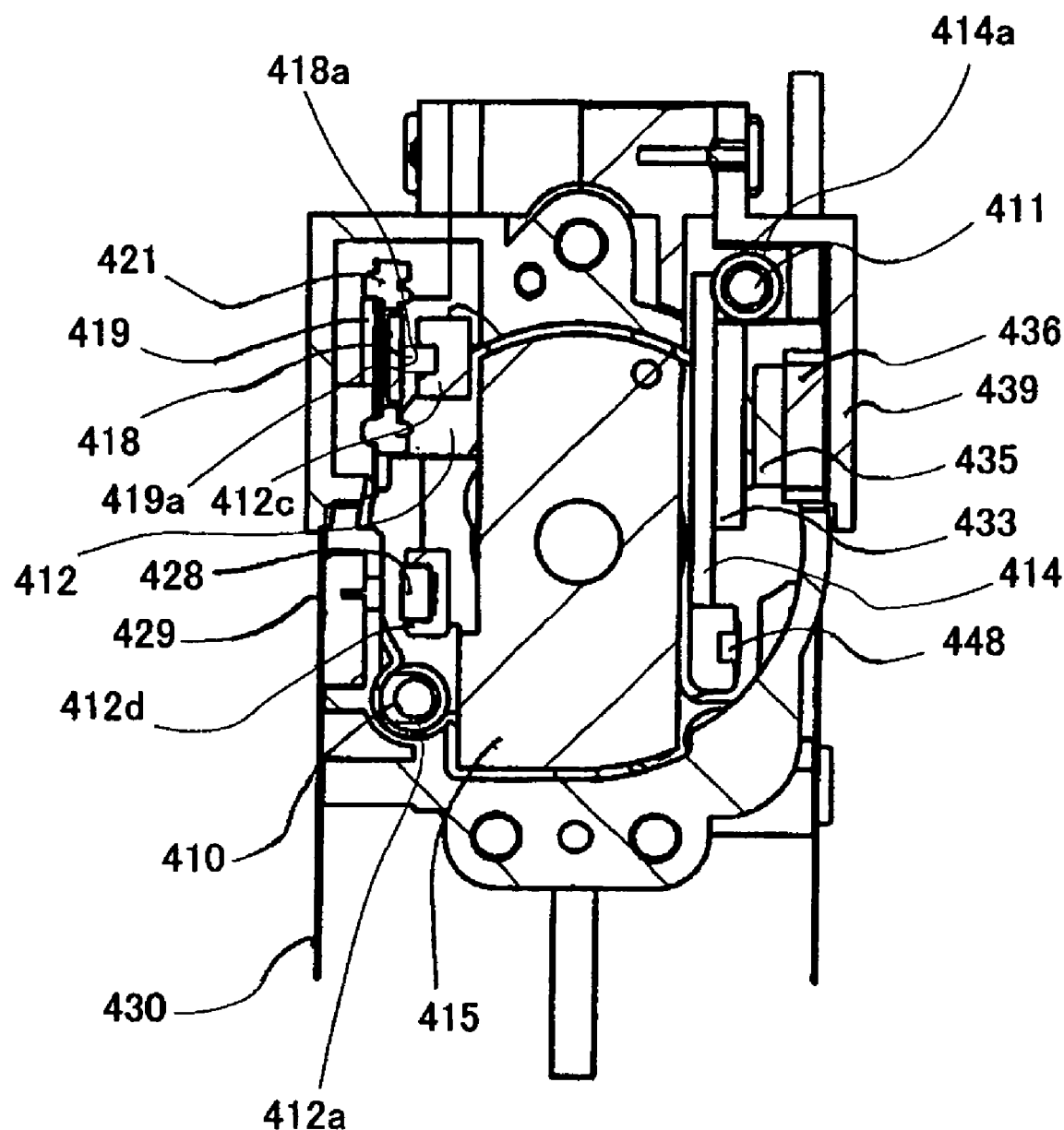
FIG. 13 is a section view showing the lens barrel in Embodiment 3 taken along a plane perpendicular to the optical axis.
Figure 14:
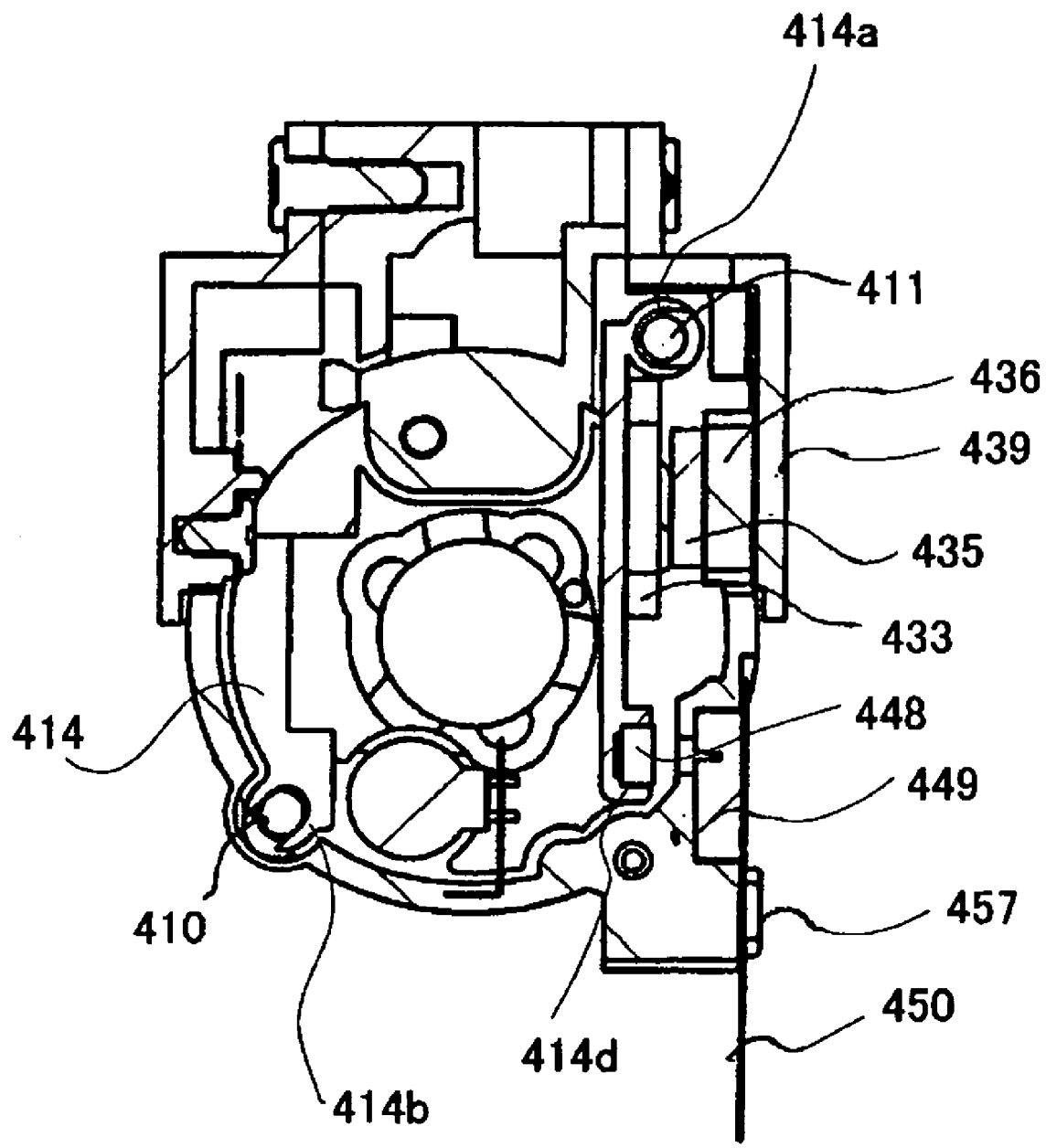
FIG. 14 is a section view showing the lens barrel in Embodiment 3 taken along a plane perpendicular to the optical axis.
Figure 15:
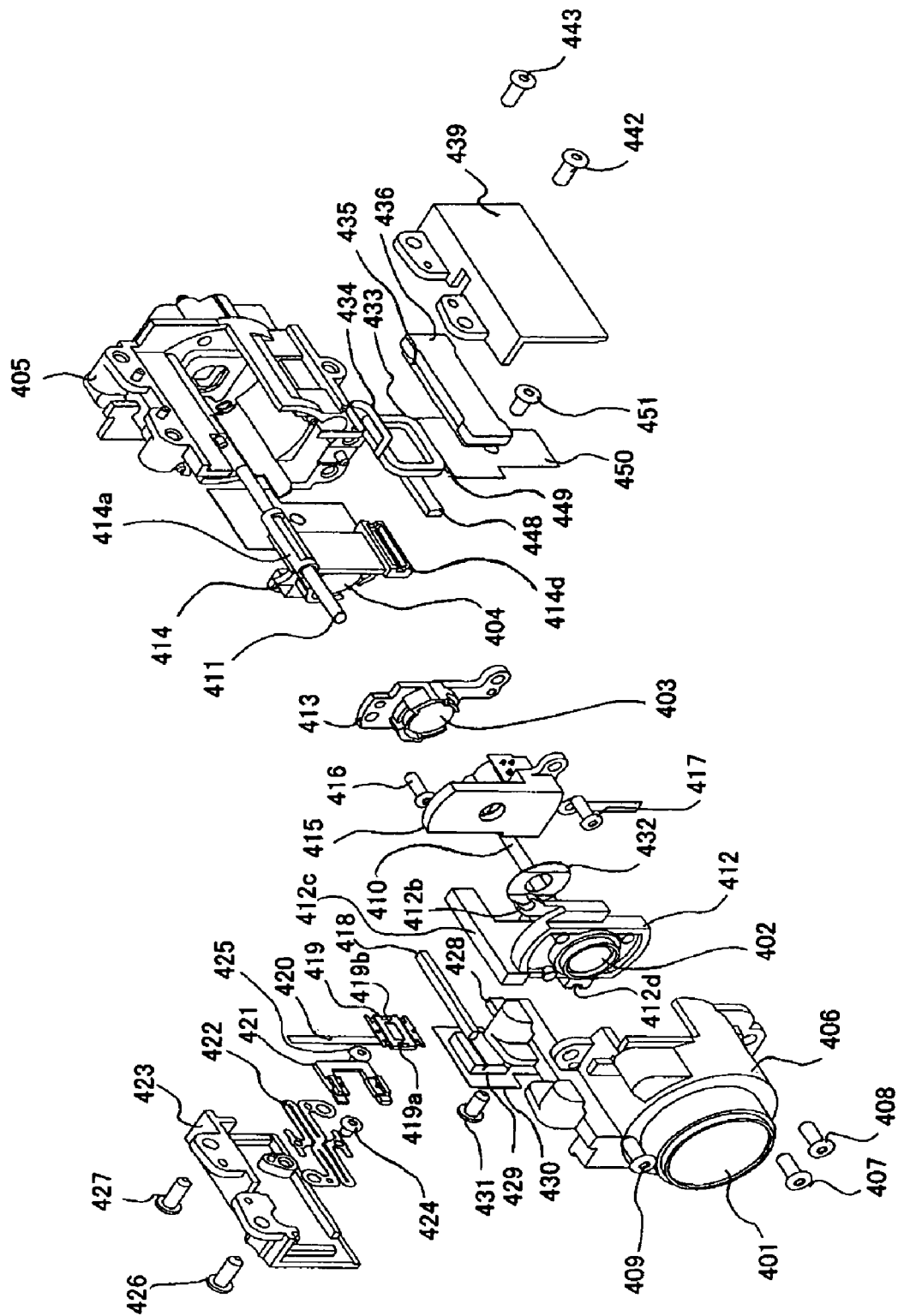
FIG. 15 is an exploded perspective view showing the lens barrel in Embodiment 3.
Figure 16:
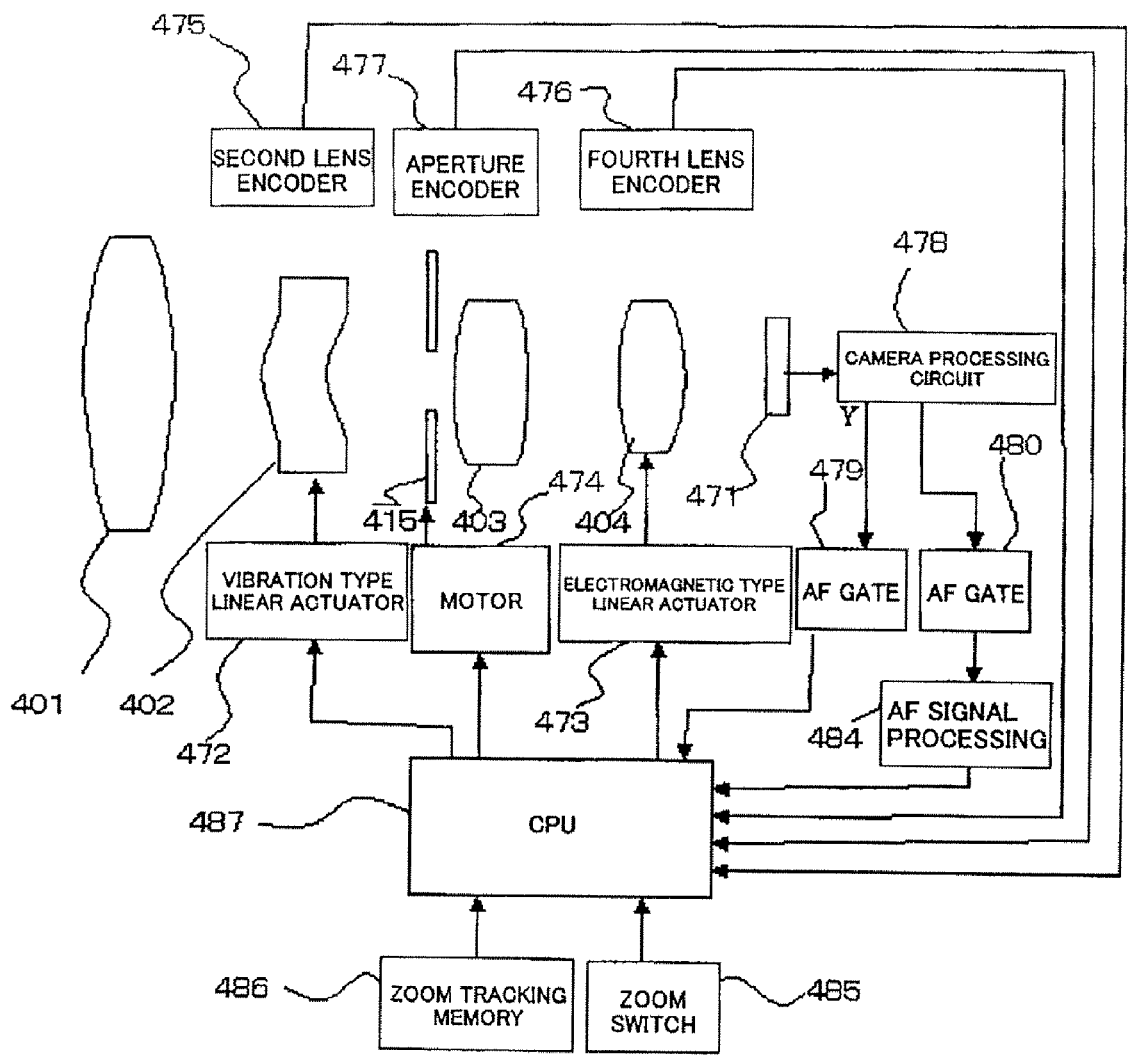
FIG. 16 is a block diagram showing the electrical structure of the image-taking apparatus of Embodiment 3.
Figure 17A:
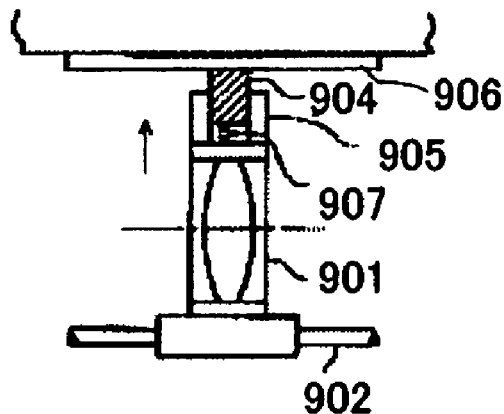
FIGS. 17A to 17D show an optical apparatus using a conventional vibration type linear actuator.
Figure 17B:
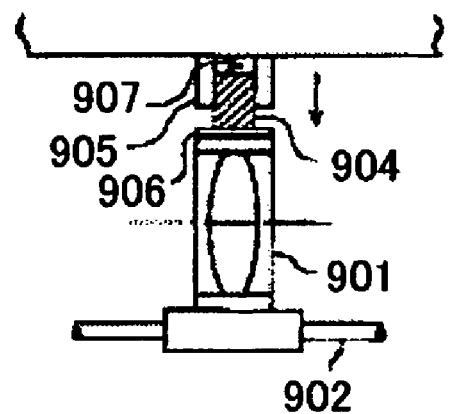
Figure 17C:
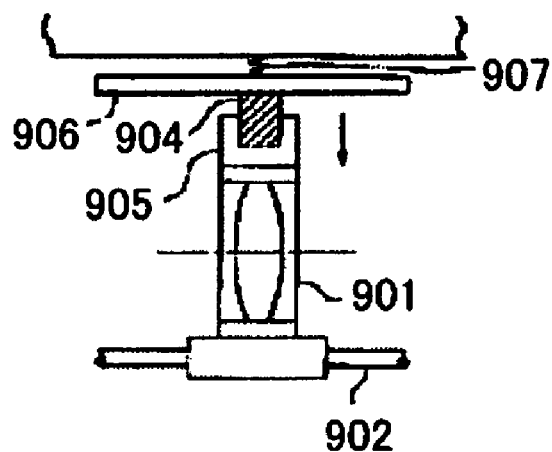
Figure 17D:
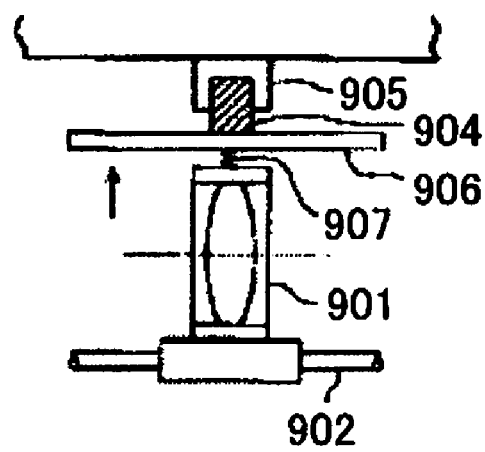
Figure 18:
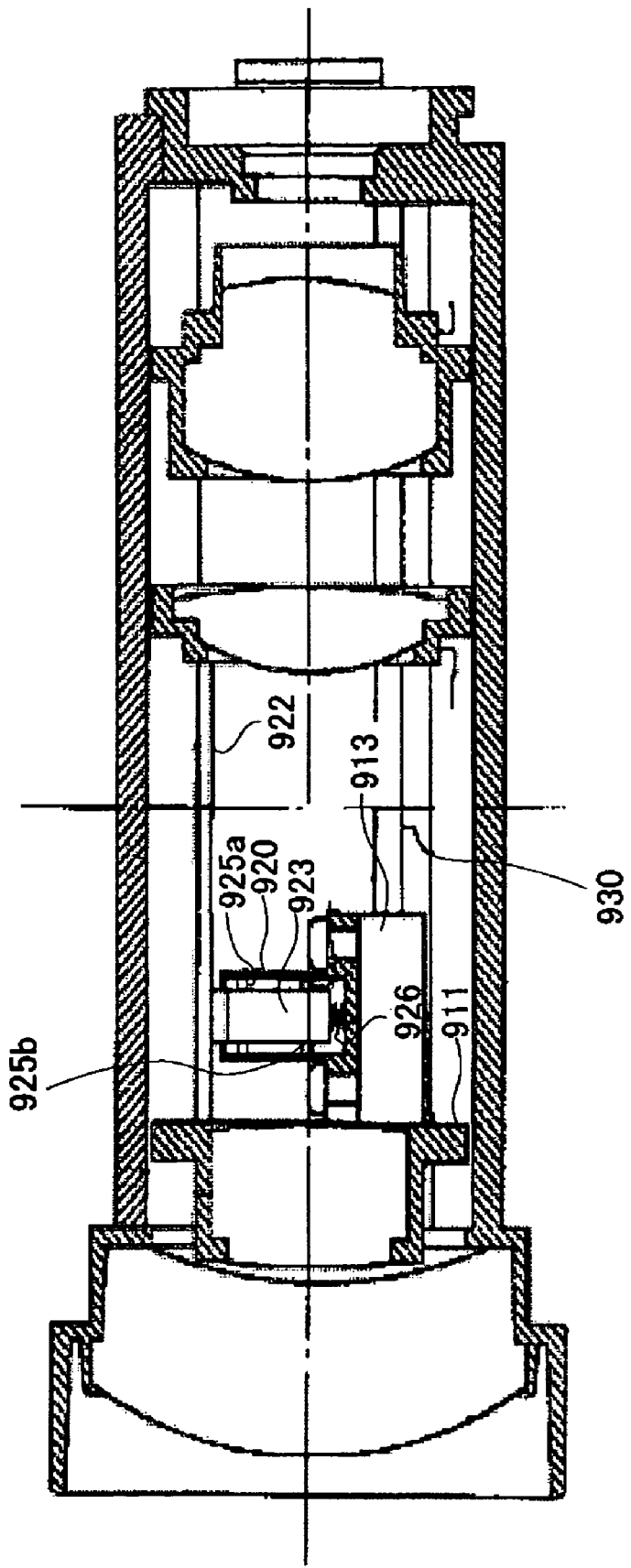
FIG. 18 shows an optical apparatus using a conventional vibration type linear actuator.

FIGS. 11A to 15 show the structure of a lens barrel of an image-taking apparatus which is Embodiment 3 of the present invention. FIGS. 11A to 11D show the lens barrel in Embodiment 3, with its exterior removed, when viewed from four directions, the right, back, left, and front, respectively. FIG. 12 shows a section view of the lens barrel in Embodiment 3 taken along a plane in parallel with an optical axis and perpendicular to a press contact surface between a slider and a vibrator of a vibration type linear actuator. FIG. 13 shows a section view of the lens barrel in Embodiment 3 taken along a plane perpendicular to the optical axis and perpendicular to a press contact surface of a vibration type linear actuator for driving a second lens unit when viewed from an object side. FIG. 14 shows a section view of the lens barrel in Embodiment 3 taken along a plane perpendicular to the optical axis and perpendicular to a press contact surface of a vibration type linear actuator for driving a fourth lens unit when viewed from the object side. FIG. 15 is an exploded view showing the lens barrel in Embodiment 3. FIG. 16 shows an electrical structure of the image-taking apparatus of Embodiment 3.

In FIGS. 11A to 16, in order from the object side, reference numerals 401 shows a fixed first lens unit, 402 the second lens unit which is movable in the optical axis direction for varying magnification, 415 a light amount adjusting unit, 403 a fixed third lens unit, and 404 the fourth lens unit which is movable in the optical axis direction for correcting image plane changes associated with varied magnification and for focal adjustment.

Reference numeral 405 shows a rear barrel which holds an image-pickup device, later described, and a low pass filter (LPF), and is fixed to a camera body, not shown. Reference numeral 406 shows a first lens holding member which holds the first lens unit 401 and is fixed to the rear barrel 405 by screws 407, 408, and 409.

Reference numerals 410 and 411 show guide bars (guide members) which are held substantially in parallel with the optical axis direction by the rear barrel 405 and the first lens holding member 406.

Reference numeral 412 shows a second lens holding member which holds the second lens unit 402 and to which a mask 432 for cutting unnecessary light is fixed. The second lens holding member 412 engages with the guide bar 410 at an engaging portion 412a to be guided in the optical axis direction and engages with the guide bar 411 at an engaging portion 412b to be prevented from rotation around the guide bar 410. Reference numeral 413 shows a third lens holding member which holds the third lens unit 403 and is fixed to the rear barrel 405 by a screw 416. Reference numeral 414 shows a fourth lens holding member which holds the fourth lens unit 404, and engages with the guide bar 411 at an engaging portion 414a to be guided in the optical axis direction and engages with the guide bar 410 at an engaging portion 414b to be prevented from rotation around the guide bar 411.

The light amount adjusting unit 415 has an outer shape which is longer in a vertical direction (first direction) than in a horizontal direction (second direction) when viewed from the optical axis direction. The light amount adjusting unit 415 is fixed to the rear barrel 405 by a screw 417. The light amount adjusting unit 415 has the same structure as that shown in FIG. 5C.

Reference numeral 418 shows a slider which is formed of a magnet and a friction material bonded to each other and is fixed into a square hole 412c in the second lens holding member 412 through adhesion or the like.

Reference numeral 419 shows a vibrator which is formed of an electromechanical energy conversion element and a plate-shaped elastic member on which vibration is produced by the electromechanical energy conversion element. The elastic member of the vibrator 419 is made of ferromagnet which is attracted by the magnet of the slider 418 to bring an press contact surface 418a of the friction material of the slider 418 into press contact with press contact surfaces 419a and 419b formed at two positions in the optical axis direction in the elastic member of the vibrator 419.

Reference numeral 420 shows a flexible wiring board which is connected to the vibrator 419 and transmits a signal to the electromechanical energy conversion element.

In a first linear actuator (vibration type linear actuator) formed of the slider 418 and the vibrator 419, while the slider 418 is in press contact with the vibrator 419, two frequency signals (pulse signals or alternate signals) in difference phases are input to the electromechanical energy conversion element through the flexible wiring board 420 to create a substantially elliptic motion in the press contact surfaces 419a and 419b of the vibrator 419 to produce driving force in the optical axis direction in the press contact surface 418a of the slider 418.

Reference numeral 421 shows a spacer to which the vibrator 419 is fixed, and 422 a plate spring to which the spacer 421 is fixed. The plate spring 422 has a shape which is not easily deformed in the in-plane direction, is easily deformed in the direction perpendicular to the plane, and is easily deformed in the rotation direction around an arbitrary axis included in the plane. The plate spring 422 not easily deformed in the in-plane direction limits displacement of the vibrator 419 in the optical axis direction (that is, the driving direction).

Reference numeral 423 shows a vibrator frame to which the plate spring 422 is fixed by screws 424 and 425. The vibrator frame 423 is fixed to the first lens holding member 406 by screws 426 and 427.

Reference numeral 428 shows a scale which detects the position of the second lens holding member 412 and is fixed into a square hole 412d in the second lens holding member 412 through adhesion or the like.

Reference numeral 429 shows a light transmitter/receiver element which applies light to the scale 428 and receives the light reflected by the scale 428 to detect the moving amount of the second lens holding member 412. The scale 428 and the light transmitter/receiver element 429 constitute a first linear encoder serving as a detector.

Reference numeral 430 shows a flexible wiring board which sends and receives a signal to and from the light transmitter/receiver element 429 and is fixed to the first lens holding member 406 by a screw 431.

As shown in FIG. 13, the guide bar 410, the first linear actuator formed of the vibrator 419 and the slider 418, and the first linear encoder formed of the light transmitter/receiver element 429 and the scale 428 are arranged along or close to a planar left side of the light amount adjusting unit 415 (linear long side on the left when viewed from the optical axis direction) that is one of the outer surfaces closest to the optical axis position of the light amount adjusting unit 415 of all of the outer surfaces thereof when viewed from the front of the optical axis direction. In Embodiment 3, the guide bar 410, the first linear encoder, and the first linear actuator are disposed in order from the bottom and next to each other.

Reference numeral 433 shows a coil which is fixed to the fourth lens holding member 414. Reference numeral 434 shows a flexible wiring board for transmitting a signal to the coil 433. The flexible wiring board 434 is deformed as the fourth lens holding member 414 is moved in the optical axis direction.

Reference numerals 435 and 436 show a magnet and a yoke, respectively. The coil 433, the magnet 435, and the yoke 436 constitute a magnetic circuit, in which the coil 433 is energized to form a second linear actuator (voice coil motor) which is an electromagnetic type linear actuator which produces driving force in the optical axis direction. Reference numeral 439 shows a yoke holding member which holds the yoke 436 and is fixed to the rear barrel 405 by screws 442 and 443.

As shown in FIG. 12, the range in which the first linear actuator is placed in the optical axis direction (the range in which the slider 418 is placed) and a movable range L2 of the second lens holding member 412 in the optical axis direction extend from the object side (the left in FIG. 12) of the light amount adjusting unit 415 toward the image plane side. The range in which the second linear actuator is placed in the optical axis direction (the range in which the magnet 435 is placed) and a movable range L4 of the fourth lens holding member 414 in the optical axis direction extend from the image plane side of the light amount adjusting unit 415 toward the object side. In other words, the ranges in which the first and second linear actuators are placed (the movable ranges of the second and fourth lens holding members 412 and 414) overlap each other in the optical axis direction.

Reference numeral 448 shows a scale which detects the position of the fourth lens holding member 414 and is fixed into a square hole 414d in the fourth lens holding member 414 through adhesion or the like. Reference numeral 449 shows a light transmitter/receiver element which applies light to the scale 448 and receives the light reflected by the scale 448 to detect the moving amount of the fourth lens holding member 414. Reference numeral 450 shows a flexible wiring board which is used to send and receive a signal to and from the light transmitter/receiver element 449 and is fixed to the rear barrel 405 by a screw 451.

As shown in FIG. 14, the guide bar 411, the second linear actuator formed of the coil 433, the magnet 435, and the yoke 436, and the second linear encoder formed of the light transmitter/receiver element 449 and the scale 448 are arranged along or close to a planar right side of the light amount adjusting unit 415 (linear long side on the right when viewed from the optical axis direction) that is one of the outer surfaces closest to the optical axis position of the light amount adjusting unit 415 of all of the outer surfaces thereof when viewed from the front of the optical axis direction. In Embodiment 3, the guide bar 411, the second linear actuator, and the second linear encoder are disposed in order from the top and next to each other.

The set of the guide bar 410, the first linear actuator, and the first linear encoder, and the set of the guide bar 411, the second linear actuator, and the second encoder are arranged substantially point-symmetrically with respect to the optical axis. To be point-symmetric in a strict sense, for example, the guide bar 411, the second linear encoder, and the second linear actuator should be disposed in this order from the top on the side of the guide bar 411, but the arrangement of Embodiment 3 may be considered to be substantially point-symmetric if the guide bars, the linear actuators, and the linear encoders are seen individually. The guide bar 411 and the second linear actuator disposed next to each other as in Embodiment 3 can drive the fourth lens holding member 414 more smoothly as compared with the case where the guide bar 411 and the second linear actuator are disposed apart, as later described. However, a strictly point-symmetric arrangement may be used.

In FIG. 16, reference numeral 471 shows the image-pickup device formed of a CCD sensor, a CMOS sensor or the like. Reference numeral 472 shows the vibration type linear actuator which includes the slider 418 and the vibrator 419, and serves as a driving source of the second lens unit 402 (second lens holding member 412). Reference numeral 473 shows the electromagnetic type linear actuator which is formed of the coil 433, the magnet 435, and the yoke 436, and serves as a driving source of the fourth lens unit 404 (fourth lens holding member 414).

Reference numeral 474 shows a motor which serves as a driving source of the light amount adjusting unit 415. Reference numeral 475 shows a second lens encoder realized by the first linear encoder which includes the scale 428 and the light transmitter/receiver element 429, 476 a fourth lens encoder realized by the second linear encoder which includes the scale 448 and the light transmitter/receiver element 449. These encoders detect the relative positions (moving amounts from a reference position) of the second lens unit 402 and the fourth lens unit 404 in the optical axis direction, respectively. While Embodiment 4 employs optical encoders as the encoders, it is possible to use a magnetic encoder or an encoder which detects an absolute position by using electrical resistance.

Reference numeral 477 shows an aperture encoder which is, for example, of the type in which a hall element is provided within the motor 474 as the driving source of the light amount adjusting unit 415 and is used to detect a rotational position relationship between a rotor and a stator of the motor 474.

Reference numeral 487 shows a CPU serving as a controller responsible for control of operation of the image-taking apparatus. Reference numeral 478 shows a camera signal processing circuit which performs amplification, gamma correction or the like on the output from the image-pickup device 471. After the predetermined processing, a contrast signal of a video signal is transmitted through an AE gate 479 and an AF gate 480. The gates 479 and 480 set an optimal range in the entire screen for extracting the signal for exposure setting and focusing. These gates 479 and 480 may have variable sizes, or a plurality of gates 479 and 480 may be provided.

Reference numeral 484 shows an AF (auto-focus) signal processing circuit for auto-focus which extracts a high-frequency component of the video signal to produce an AF evaluation value signal. Reference numeral 485 shows a zoom switch for zooming operation. Reference numeral 486 shows a zoom tracking memory which stores information about target positions to which the fourth lens unit 404 is to be driven in accordance with the camera-to-object distance and the position of the second lens unit 402 in order to maintain an in-focus state in varying magnification. Memory in the CPU 487 may be used as the zoom tracking memory.

In the abovementioned structure, when a user operates the zoom switch 485, the CPU 487 controls the vibration type linear actuator 472 for driving the second lens unit 402 and calculates the target driving position of the fourth lens unit 404 based on the information in the zoom tracking memory 486 and the current position of the second lens unit 402 determined from the detection result of the second lens unit encoder 475 to control the electromagnetic type linear actuator 473 for driving of the fourth lens unit 404 to that target driving position. Whether or not the fourth lens unit 404 has reached the target driving position is determined by the matching of the current position of the fourth lens unit 404 provided from the detection result of the fourth lens unit encoder 476 with the target driving position.

In the auto-focus, the CPU 487 controls the electromagnetic type linear actuator 473 to drive the fourth lens unit 404 to search for the position where the AF evaluation value determined by the AF signal processing circuit 484 is at the peak.

To provide appropriate exposure, the CPU 487 controls the motor 474 of the light amount adjusting unit 415 to increase or reduce the aperture diameter such that the average value of the luminance signal through the AE gate 479 is equal to a predetermined value, that is, such that the output from the aperture encoder 477 has a value corresponding to the predetermined value.

In the abovementioned structure, the slider 418 is formed by using the magnet which attracts the vibrator 419 to provide the press contact force necessary for producing the driving force as the vibration type linear actuator. Thus, any reaction force of the press contact force does not act on the second lens holding member 412. As a result, the frictional force produced at the engaging portions 412a and 412b of the second lens holding member 412 engaging with the guide bars 410 and 411 is not increased and the driving load due to the friction is not increased. In addition, the plate spring 422 produces small force, so that the force acting from the plate spring 422 on the engaging portions 412a and 412b engaging with the guide bars 410 and 411 is small and hardly increases the frictional force produced at the engaging portions 412a and 412b. This enables the use of the low-power and small vibration type linear actuator, resulting in a reduction in size of the lens barrel.

Since large press contact force does not act on the second lens holding member 412, the frictional force produced at the engaging portions 412a and 412b of the second lens holding member 412 engaging with the guide bars 410 and 411 is not increased. The power or size of the first linear actuator does not need to be increased, and the wear due to the friction between the guide bars 410, 411 and the engaging portions 412a, 412b can be reduced. Also, the fine driving of the second lens holding member 412 (second lens unit 402) can be accurately achieved.

Even when a manufacturing error or the like changes the position of any press contact surface with respect to an axis in parallel with the optical axis or the inclination around that axis in the optical axis direction, the plate spring 422 is deformed to change the position or inclination (orientation) of the vibrator 419 to maintain both of the press contact surfaces in parallel with each other, thereby holding an appropriate contact state between the surfaces. The plate spring 422 has a spring constant set such that it is deformed in response to a smaller force than the abovementioned press contact force. The press contact force is not changed greatly even when the position or inclination of any press contact surface is changed. Consequently, it is possible to provide stably an output consistent with the performance inherent in the first linear actuator.

The vibration type linear actuator is not displaced even when it is not powered since the vibrator is always in press contact with the slider. Particularly, the second lens unit 402 is moved only in varying magnification and often stationary, so that the use of the vibration type linear actuator for driving the second lens unit can save power as compared with the linear actuator using electromagnetic force.

On the other hand, in the linear actuator using electromagnetic force, no contact portion is provided and thus no portion is worn. Since force is produced only in the driving direction and any lateral pressure does not act on the driven member (fourth lens holding member 414), any lateral pressure does not act on the engaging portions 414a and 414b of the driven member engaging with the guide bars 411 and 410, and the engaging portions 414a and 414b are hardly worn. Particularly, the fourth lens unit is moved in varying magnification and focusing, and its moving amount is larger than that of the second lens unit due to the AF operation. Therefore, the electromagnetic type linear actuator is more effective for use in driving the fourth lens unit than the vibration type linear actuator in order to enhance the durability.

As described above, in Embodiment 3, the guide bar 410, the first linear actuator, and the first linear encoder are disposed next to each other along (close to) the left side which is one of the outer surfaces of the light amount adjusting unit 415 closest to the optical axis position when viewed from the optical axis direction. The guide bar 411, the second linear actuator, and the second linear encoder are disposed next to each other along (close to) the right side which is one of the outer surfaces of the light amount adjusting unit 415 closest to the optical axis position when viewed from the optical axis direction. Thus, although the optical apparatus has the light amount adjusting unit 415, the two linear actuators for driving the second and fourth lens holding members 412 and 414 (second and fourth lens units 402 and 404) disposed on the object side and the image plane side of the light amount adjusting unit 415, the two guide bars 410 and 411 for guiding the lens holding members 412 and 414 in the optical axis direction, and the two linear encoders for detecting the positions of the lens holding members 412 and 414, it can be formed in a compact size.

The scale 428 of the first linear encoder disposed next to the guide bar 410 reduces displacement of the scale 428 due to backlash of the engaging portions 412a and 412b of the second lens holding member 412 engaging with the guide bars 410 and 411 to enable accurate detection of positions.

When the linear actuator and the linear encoder are disposed across the optical axis from the guide bar for guiding the lens holding member which is driven and whose position is detected by them, the linear encoder may be moved in the direction opposite to the driving direction with the guide bar as the supporting point at the start of the driving due to backlash at the engaging portion of the lens holding member engaging with the guide bar. This may reduce the accuracy of the position detection. In Embodiment 3, however, the linear actuator and the linear encoder are disposed on the same side as the guide bar for guiding the lens holding member which is driven and whose position is detected by them, so that such a problem does not arise and the position can be detected accurately.

In addition, since the second linear actuator is disposed next to the guide bar 411, the fourth lens holding member 414 can be driven smoothly.

According to each of Embodiments 1 to 3, the force for bringing the vibrator and the contact member into press contact with each other is generated by a magnetic force acting between them. This enables preventing the reaction force of the press contact force from being transmitted to the outside of the vibrator and contact member. Therefore, in a case where the lens holding member engages with the guide member guiding the lens holding member in the optical axis direction, the friction in the engagement part is not increased, thereby preventing an increase of the driving load of the lens holding member. This enables the use of a low-power and small vibration type linear actuator, resulting in a reduction in size of the lens barrel. Further, the wear generated in the engagement part can be reduced, and a fine and accurate lens drive can be performed.

The preferred embodiments of the present invention have been described. However, the present invention is not limited to the structures described in Embodiments 1 to 3, and various modifications may be made in each of Embodiments 1 to 3.

While each of Embodiments 1 to 3 has been descried in conjunction with the image-taking apparatus integral with the lens, the present invention is applicable to an interchangeable lens (optical apparatus) which is removably mounted on an image-taking apparatus body. The present invention is applicable not only to the image-taking apparatus, but also to various optical apparatuses for driving a lens by a vibration type linear actuator.

While each of Embodiments 1 to 3 has been described in conjunction with the holding mechanism which holds the vibrator and the slider at variable positions and inclinations, it is possible to provide a holding mechanism which allows one of the position and inclination to be variable.

This application claims a foreign priority benefit based on Japanese Patent Application No. 2005-125753, filed on Apr. 22, 2005, which is hereby incorporated by reference herein in its entirety as if fully set forth herein.

What is claimed is:

1. An optical apparatus comprising
    a lens holding member which holds a lens;
    a guide member which engages the lens holding member to guide the lens holding member in an optical axis direction;
    a vibration type linear actuator which drives the lens holding member in the optical axis direction, the vibration type linear actuator including: a vibrator which includes an electromechanical energy conversion element and a ferromagnetic elastic member having a press contact surface on which a vibration is produced by the electromechanical energy conversion element, and a magnetic contact member having a press contact surface that is in press contact with the press contact surface of the ferromagnetic elastic member of the vibrator at one side and engaged with the lens holding member at the other side thereby guiding the lens holding member in the optical axis direction according to a frictional force produced by the vibrator and a magnetic force acting between the vibrator and the magnetic contact member; and
    a plate spring which holds the press contact surface of the elastic member of the vibrator in parallel with the press contact surface of the contact member, each of the press contact surfaces being a planar surface,
    wherein the plate spring is deformable in a rotation direction around an axis included in a plane parallel to the press contact surfaces.

2. The optical apparatus according to claim 1, further comprising:
    a spacer to which the vibrator is fixed at one side and the plate spring fixed at the other side,
    wherein the plate spring has a spring constant set such that it is deformed in response to a smaller force than the magnetic force acting between the vibrator and the contact member in the direction perpendicular to the optical axis direction.

* * * * *